United States Patent
Ackmann et al.

(10) Patent No.: US 9,854,653 B1
(45) Date of Patent: Dec. 26, 2017

(54) SCALABLE BUILDING CONTROL SYSTEM, METHOD, AND APPARATUS

(71) Applicant: Crestron Electronics, Inc., Rockleigh, NJ (US)

(72) Inventors: Evan Ackmann, Hoboken, NJ (US); Douglas Jacobson, Oradell, NJ (US); Russikesh Kumar, Ridgewood, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 15/420,818

(22) Filed: Jan. 31, 2017

(51) Int. Cl.
*H05B 37/02* (2006.01)
*H04W 84/18* (2009.01)
(Continued)

(52) U.S. Cl.
CPC ..... *H05B 37/0272* (2013.01); *H05B 37/0218* (2013.01); *H05B 37/0227* (2013.01);
(Continued)

(58) Field of Classification Search
CPC ............ H05B 37/0272; H05B 37/0218; H05B 37/0227; F21V 23/04; H04W 4/008; H04W 84/18; H04W 88/16
(Continued)

(56) References Cited

U.S. PATENT DOCUMENTS

| 6,073,110 A | 6/2000 | Rhodes et al. |
| 6,157,093 A | 12/2000 | Giannopoulos et al. |

(Continued)

FOREIGN PATENT DOCUMENTS

| CA | 2311245 A1 | 4/1999 |
| EP | 0606335 B1 | 8/1997 |

(Continued)

OTHER PUBLICATIONS

Lutron Electronics Co., Inc., PowPak® 20A Relay Module, Product Brochure, Apr. 2014.
(Continued)

*Primary Examiner* — Don Le
(74) *Attorney, Agent, or Firm* — Crestron Electronics, Inc

(57) ABSTRACT

A scalable lighting control system comprising a plurality of room lighting control systems each comprising a load controller electrically connected to a lighting load and one or more in-room devices, such as lighting control devices, occupancy sensors, and light sensors. Each in-room device is configured for transmitting room control messages to the load controller over a room wireless network. The scalable lighting control system further comprises a plurality of network bridges each configured for removably coupling to at least one load controller of a room lighting control system to connect the room lighting control system to a centralized wireless network. Each network bridge is configured for receiving centralized control messages over the centralized wireless network and transmitting the centralized control messages to the connected load controller. The load controller is configured for controlling the electrically connected lighting load in response to the room control messages and the centralized control messages.

39 Claims, 11 Drawing Sheets

(51) Int. Cl.
  *H04W 88/16* (2009.01)
  *H04W 4/00* (2009.01)
  *F21V 23/04* (2006.01)
(52) U.S. Cl.
  CPC ............ *F21V 23/04* (2013.01); *H04W 4/008* (2013.01); *H04W 84/18* (2013.01); *H04W 88/16* (2013.01)
(58) Field of Classification Search
  USPC ........................................................ 315/291
  See application file for complete search history.

(56) References Cited

U.S. PATENT DOCUMENTS

| | | |
|---|---|---|
| 6,294,889 B1 | 9/2001 | Briant et al. |
| 6,392,368 B1 | 5/2002 | Deller et al. |
| 6,587,739 B1 | 7/2003 | Abrams et al. |
| 6,832,251 B1 | 12/2004 | Gelvin et al. |
| 6,927,547 B2 | 8/2005 | Walko, Jr. et al. |
| 7,027,416 B1 | 4/2006 | Kriz |
| 7,860,495 B2 | 12/2010 | McFarland |
| 8,131,399 B2 | 3/2012 | Ahmed |
| 8,200,273 B2 | 6/2012 | McFarland |
| 8,350,691 B2 | 1/2013 | McFarland |
| 8,364,325 B2 | 1/2013 | Huizenga et al. |
| 8,410,896 B2 | 4/2013 | Laveruha et al. |
| 8,457,793 B2 | 6/2013 | Golding et al. |
| 8,538,589 B2 | 9/2013 | Ahmed |
| 8,731,689 B2 | 5/2014 | Platner et al. |
| 8,981,651 B2 | 3/2015 | Askin et al. |
| 9,002,522 B2 | 4/2015 | Mohan et al. |
| 9,006,996 B2 | 4/2015 | Mohan et al. |
| 9,078,305 B2 | 7/2015 | Pelton et al. |
| D739,359 S | 9/2015 | Creasman |
| 9,215,784 B2 | 12/2015 | Platner et al. |
| 9,337,943 B2 | 5/2016 | Mosebrook et al. |
| 2002/0050932 A1 | 5/2002 | Rhoades et al. |
| 2013/0231796 A1* | 9/2013 | Lu ...................... H04L 12/2807 700/295 |
| 2014/0001846 A1 | 1/2014 | Mosebrook et al. |
| 2014/0001977 A1 | 1/2014 | Zacharchuk et al. |
| 2014/0207281 A1* | 7/2014 | Angle .................. H04L 12/282 700/257 |
| 2014/0293993 A1* | 10/2014 | Ryhorchuk ........... H04W 4/006 370/350 |
| 2016/0102879 A1* | 4/2016 | Guest .................... F24F 11/001 700/276 |
| 2017/0111153 A1* | 4/2017 | Scholten ............... H04L 5/0053 |
| 2017/0223807 A1* | 8/2017 | Recker ............... H05B 37/0227 |

FOREIGN PATENT DOCUMENTS

| | | |
|---|---|---|
| EP | 1626532 A2 | 2/2006 |
| EP | 1470456 B1 | 12/2009 |
| EP | 1057318 B1 | 5/2011 |
| EP | 1470457 B1 | 10/2011 |
| EP | 2642696 A2 | 9/2013 |
| EP | 2642697 A2 | 9/2013 |
| WO | WO9917477 A2 | 4/1999 |
| WO | WO213413 A1 | 2/2002 |
| WO | WO3061175 A2 | 7/2003 |

OTHER PUBLICATIONS

EcoSense Lighting Inc., Linear Dimming Control Module, Product Brochure, 2014.
Hubbell Incorporated, Product Brochure, H-MOSS® Occupancy Sensors WL-Series Wireless Controls—Control Unit, WLDHM016 Feb. 2012.
Smarthome, INSTEON® 240V 30 Amp Load Controller, Product Brochure, Rev Apr. 28, 2011.

\* cited by examiner

SCALABLE BUILDING CONTROL SYSTEM, METHOD, AND APPARATUS

BACKGROUND OF THE INVENTION

Technical Field

Aspects of the embodiments relate to building control systems, and more specifically to a scalable building control system that can be scaled up from a single room control to a centralized control of an entire building.

Background Art

Today's building control systems, such as lighting control systems, are either distributed (i.e., standalone) or centralized. Standalone systems are simple, inexpensive, and easy to install because they require no advanced knowledge or programming. These standalone systems, however, typically lack advanced features such as time clock control or reporting and are therefore unsuitable for large building applications. The advanced control systems come rich with features. However, they come at higher cost and complexity and are difficult to install. These advanced control systems require programming and expert designers with higher order understanding of building automation systems.

This dichotomy means that product lines tend to focus on one extreme or the other. Simple systems are not made feature-rich and complex systems always require an intelligent commissioning agent. The two system types do not cross-over, requiring consumers to reinstall complete systems to switch one to another. Another undesired consequence is that as site requirements change or if there are different requirements for different portions of a site (the legal group in a commercial building needs more flexibility than the engineering group, for example), then the same product cannot be deployed throughout the site.

Accordingly, a need has arisen for scalable building control system that can be scaled up at any time from a single room control to an entire building control.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a building control system that will obviate or minimize problems of the type previously described.

More particularly, it is an aspect of the embodiments to provide systems, methods, and modes for a scalable building control system that can be scaled up from a single room control to an entire building control.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to a first aspect of the embodiments, a scalable lighting control system is provided comprising an in-room device, a load controller, and a network bridge. The in-room device comprises a wireless network interface configured for transmitting room control messages over a room wireless network. The load controller comprises a wireless network interface configured for receiving the room control messages from the in-room devices over the room wireless network; a bridge interface; and a power controller configured for electrically connecting to a lighting load. The network bridge is configured for removably coupling to the load controller. The network bridge comprises a wireless network interface configured for receiving centralized control messages over a centralized wireless network; and a load interface configured for connecting to the bridge interface of the load controller and transmitting the centralized control messages to the load controller. The load controller is configured for controlling the lighting load in response to the room control messages received from the in-room device and the centralized control messages received from the network bridge.

According to further aspects of the embodiment, the in-room device may comprise a lighting control device including a user interface configured for receiving room control messages from a user. Additionally, the in-room device may comprise an occupancy sensor configured for detecting an occupancy status of a room and generating room control messages based on the detected occupancy status. The in-room device may further comprise a light sensor configured for detecting natural light intensities in a room and generating room control messages based on the detected natural light intensities.

According to an embodiment, the power controller of the load controller may comprise a switch configured for switching the connected lighting load on and off. According to another embodiment, the power controller of the load controller may comprise a dimmer configured for providing a dimmed voltage output signal to the connected lighting load.

According to an embodiment, the load controller may comprise a power supply configured for receiving power from a power source and powering the network bridge via the bridge interface. The bridge interface of the load controller may comprise a port and the load interface of the network bridge may comprise a plug. Alternatively, the load interface of the network bridge may comprise a port and the bridge interface of the load controller may comprise a plug.

According to an embodiment, the room wireless network may comprise a peer-to-peer radio frequency mesh wireless network. The centralized wireless network may comprise a radio frequency mesh wireless network. Furthermore, the room wireless network may comprise a low latency low bandwidth wireless network configured for substantially real-time communication. The centralized wireless network may comprise latency and bandwidth higher than the latency and bandwidth of the room wireless network. According to an embodiment, the centralized wireless network may comprise a high latency high bandwidth wireless network configured for transmitting large amount of data over the centralized wireless network.

According to an embodiment, the load controller may comprise a memory configured for maintaining a room status report comprising information about the lighting load and the in-room device. The load controller may transmit the room status report to the network bridge for transmission over the centralized wireless network. The information about the lighting load and the in-room device may comprise at least one of a channel of the room wireless network, type of the in-room device, type of available output and input of the in-room device, a number of in-room devices in a room, a number of lighting loads in the room, status of the lighting load, status of the in-room device, and any combinations thereof.

According to an embodiment, the load controller may comprise a housing comprising a threaded nipple configured for mounting the load controller to a junction box. The load controller may further comprise a recess and the network bridge may comprise a housing sized and shaped to be recessed within the recess of the load controller. The network bridge may be retained within the recess using hooks. The recess may comprise a port connected to the bridge interface and configured for receiving a plug connected to the load interface of the network bridge. The network bridge may comprise a Bluetooth module configured for communication with a mobile device.

According to an embodiment, the scalable lighting control system further comprises a control processor configured for transmitting centralized control messages to the network bridge over the centralized wireless network. The control processor may be configured for connecting to a plurality of network bridges. The control processor may be connected to the centralized wireless network via one or more wireless gateways. The load controller may comprise a memory configured for maintaining a room status report comprising information about the lighting load and the in-room device, which it may transmit to the network bridge for transmission to the control processor over the centralized wireless network. According to an embodiment, the control processor may comprise a user interface configured for receiving centralized control messages from a user. The control processor may further comprise a network interface configured for receiving centralized control messages from a remote server.

According to an embodiment, the control processor may comprise a timeclock and a memory configured for storing a plurality of timed events. The control processor may generate centralized control messages for transmission to the network bridge based on the plurality of timed events. Additionally, the control processor may be configured for transmitting a firmware update to the network bridge; the network bridge may be configured for receiving the firmware update and storing the firmware update as firmware images on a memory; the network bridge may transmit the firmware images to the load controller; and the load controller may transmit the firmware images to the in-room device.

According to another aspect of the embodiments, a method executed by a load controller of a scalable lighting control system is provided, wherein the load controller comprises a wireless network interfaces configured for communicating over a room wireless network, a bridge interface configured for removably coupling to a network bridge, and a power controller configured for electrically connecting to a lighting load. The method comprises the steps of: (i) receiving room control messages over the room wireless network from one or more in-room devices; (ii) controlling the lighting load in response to the room control messages; (iii) detecting a connection to the network bridge via the bridge interface, wherein the network bridge is configured for receiving centralized control messages from a centralized wireless network; (iv) receiving the centralized control messages from the network bridge; and (v) controlling the lighting load in response to the centralized control messages.

According to another aspect of the embodiments, a scalable lighting control system is provided comprising a plurality of room lighting control systems each comprising: one or more in-room devices each configured for transmitting room control messages over a room wireless network; and a load controller configured for receiving the room control messages from the in-room devices over the room wireless network and controlling an electrically connected lighting load in response to the room control messages. The scalable lighting control system further comprises a plurality of network bridges each configured for removably coupling to at least one load controller of a room lighting control system to connect the room lighting control system as a node of a centralized wireless network, wherein each network bridge is configured for receiving centralized control messages over the centralized wireless network and transmitting the centralized control messages to a connected load controller, wherein the connected load controller is configured for controlling an electrically connected lighting load in response to the centralized control messages.

According to an embodiment, the one or more in-room devices may comprise at least one of a lighting control device, an occupancy sensor, a light sensor, and any combinations thereof. The scalable lighting control system may further comprise a control processor configured for transmitting centralized control messages to the plurality of network bridges over the centralized wireless network. The control processor may be configured for transmitting a firmware update to the plurality of network bridges; each network bridge may be configured for receiving the firmware update and storing the firmware update as firmware images on a memory; each network bridge may transmit the firmware images to a connected load controller; and the connected load controller may transmit the firmware images to the in-room device.

According to another aspect of the embodiments, a scalable lighting control system is provided comprising a plurality of room lighting control systems each comprising: one or more in-room devices each configured for transmitting room control messages over a room wireless network; and a load controller configured for receiving the room control messages from the in-room devices over the room wireless network and controlling an electrically connected lighting load in response to the room control messages. The scalable lighting control system may further comprise a plurality of network bridges each configured for removably coupling to at least one load controller of a room lighting control system to connect the room lighting control system as a node of a centralized wireless network, wherein each network bridge is configured for receiving status information from a connected load controller and transmitting the status information over the centralized wireless network.

According to another aspect of the embodiments, a scalable lighting control system is provided comprising a plurality of room lighting control systems each comprising one or more in-room devices each configured for transmitting room control messages over a room wireless network; and a load controller configured for receiving the room control messages from the in-room devices over the room wireless network and controlling an electrically connected lighting load in response to the room control messages. The scalable lighting control system further comprises a plurality of network bridges each configured for removably coupling to at least one load controller of a room lighting control system to connect the room lighting control system as a node of a centralized wireless network, wherein each network bridge is configured for transmitting messages between the centralized wireless network and a connected load controller.

According to another aspect of the embodiments, a scalable lighting control system is provided comprising a control processor, a plurality of room lighting control systems, and a plurality of network bridges. The control processor is connected via a wireless network interface to a centralized wireless network and configured for transmitting centralized control messages. Each of the plurality of room lighting control systems comprises one or more in-room devices and a load controller. Each of the one or more in-room devices comprises a wireless network interface configured for transmitting room control messages over a room wireless network. The load controller comprises a wireless network interface configured for receiving the room control messages from the in-room devices over the room wireless network; a bridge interface; and a power controller configured for electrically connecting to a lighting load and configured for controlling the lighting load in response to the room control messages received from the in-room devices. Each of the plurality of network bridges is configured for removably coupling to at least one load controller of a room lighting control system to connect the room lighting control system to the control processor over the centralized wireless network. Each network bridge comprises: a wireless network interface configured for receiving the centralized control messages from the control processor over the centralized wireless network; and a load interface configured for connecting to a bridge interface of a load controller and transmitting the centralized control messages to the connected load controller. The connected load controller is configured for controlling an electrically connected lighting load in response to the centralized control messages received from the connected network bridge.

According to another aspect of the embodiments, a scalable lighting control system is provided comprising: a lighting control device, a dedicated network bridge power supply, and a network bridge. The lighting control device comprises: a user interface configured for receiving room control messages from a user; a load controller configured for electrically connecting to a lighting load; and a wireless network interface configured for communicating over a room wireless network. The dedicated network bridge power supply comprises: a wireless network interface configured for communicating over the room wireless network; a power supply; and a bridge interface. The network bridge is configured for removably coupling to the dedicated network bridge power supply and comprises: a wireless network interface configured for receiving centralized control messages over a centralized wireless network; and a load interface configured for connecting to the bridge interface for receiving power from the dedicated network bridge power supply and transmitting the centralized control messages to the dedicated network bridge power supply. The lighting control device is configured for controlling the lighting load in response to the room control messages received from the in-room devices and the centralized control messages received from the dedicated network bridge power supply.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
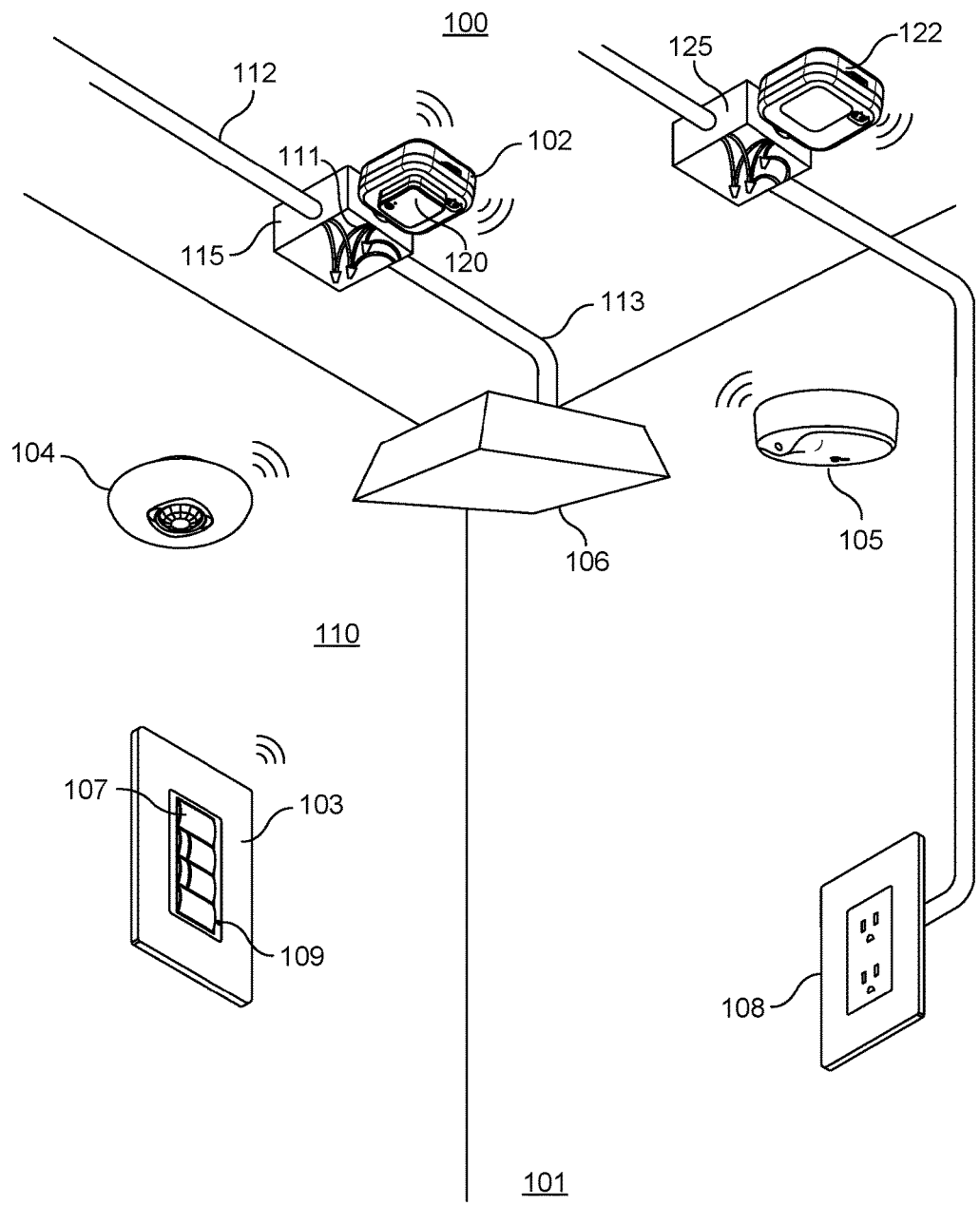

FIG. 1 illustrates a room lighting control system according to an illustrative aspect of the embodiments.

Figure 2:
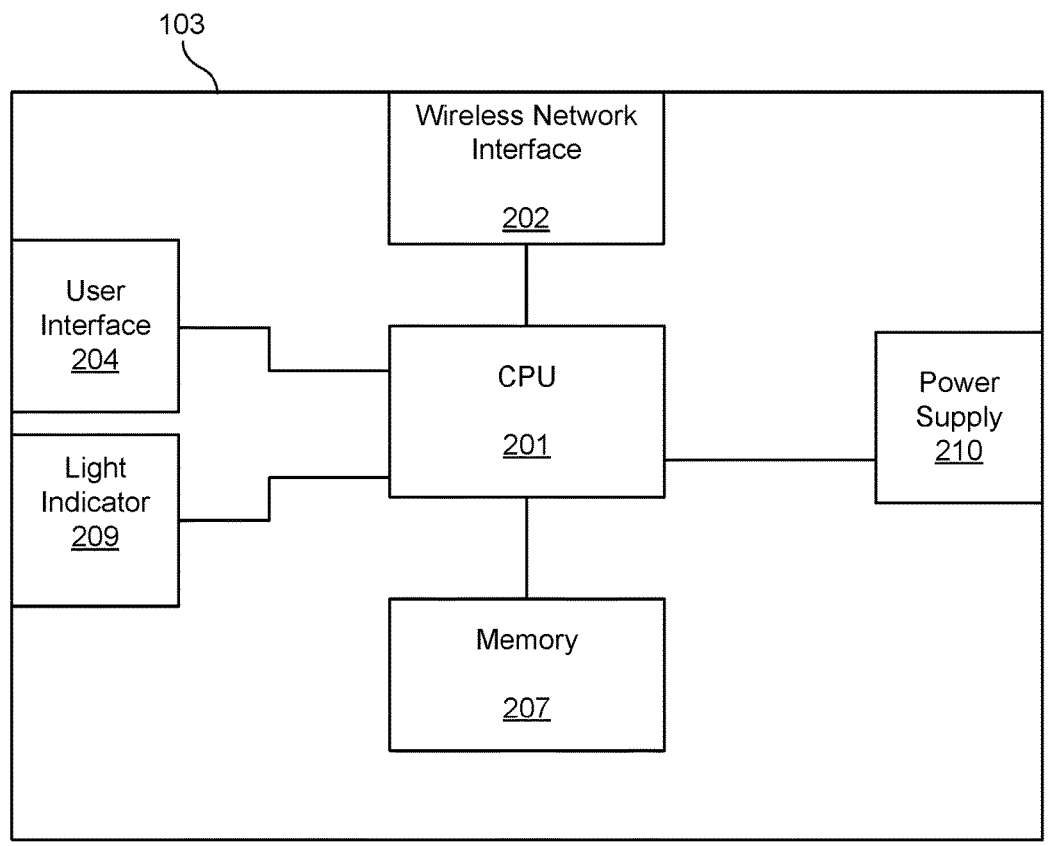

FIG. 2 is an illustrative block diagram of a lighting control device according to an illustrative aspect of the embodiments.

Figure 3:
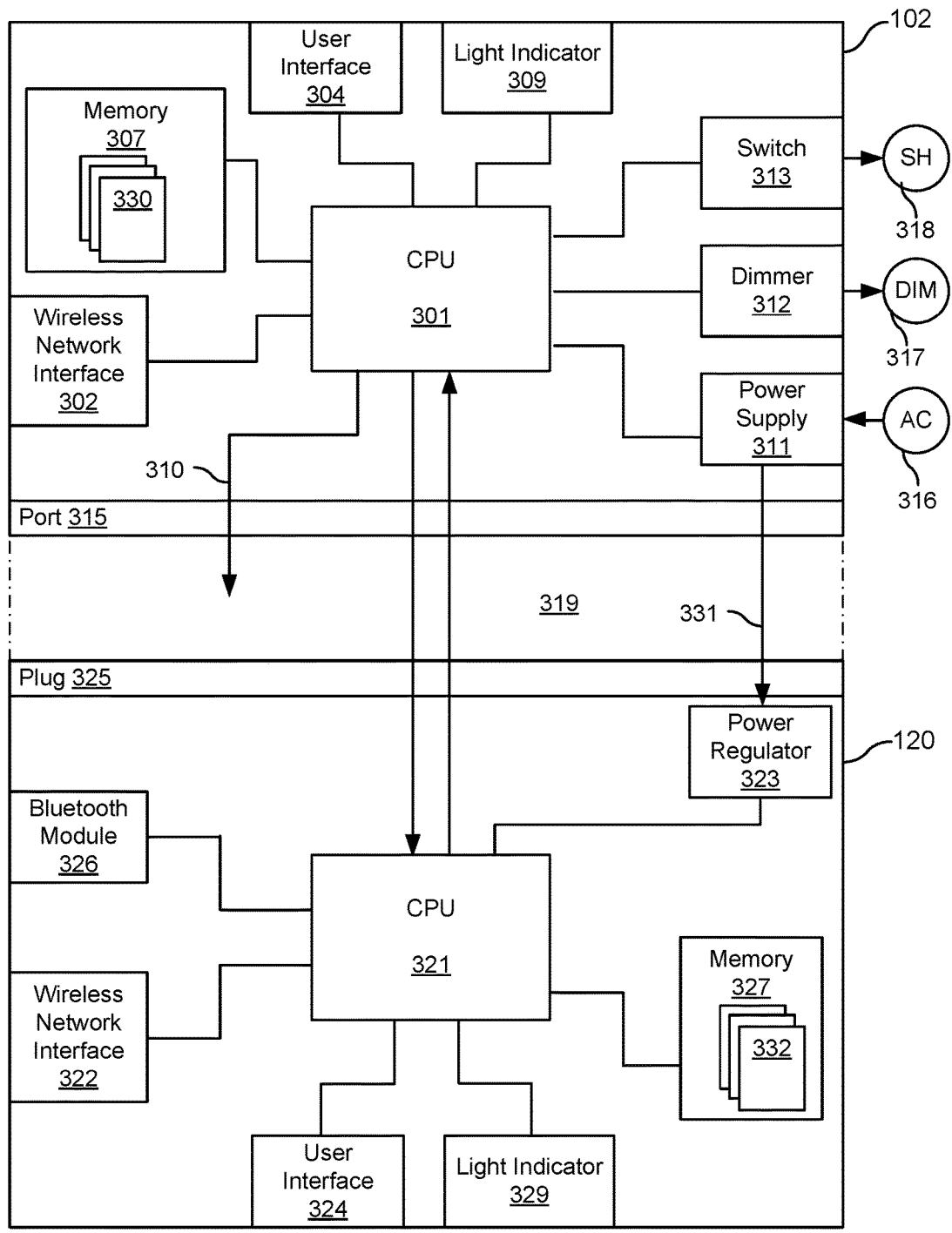

FIG. 3 is an illustrative block diagram of a load controller and a network bridge according to an illustrative aspect of the embodiments.

Figure 4A:
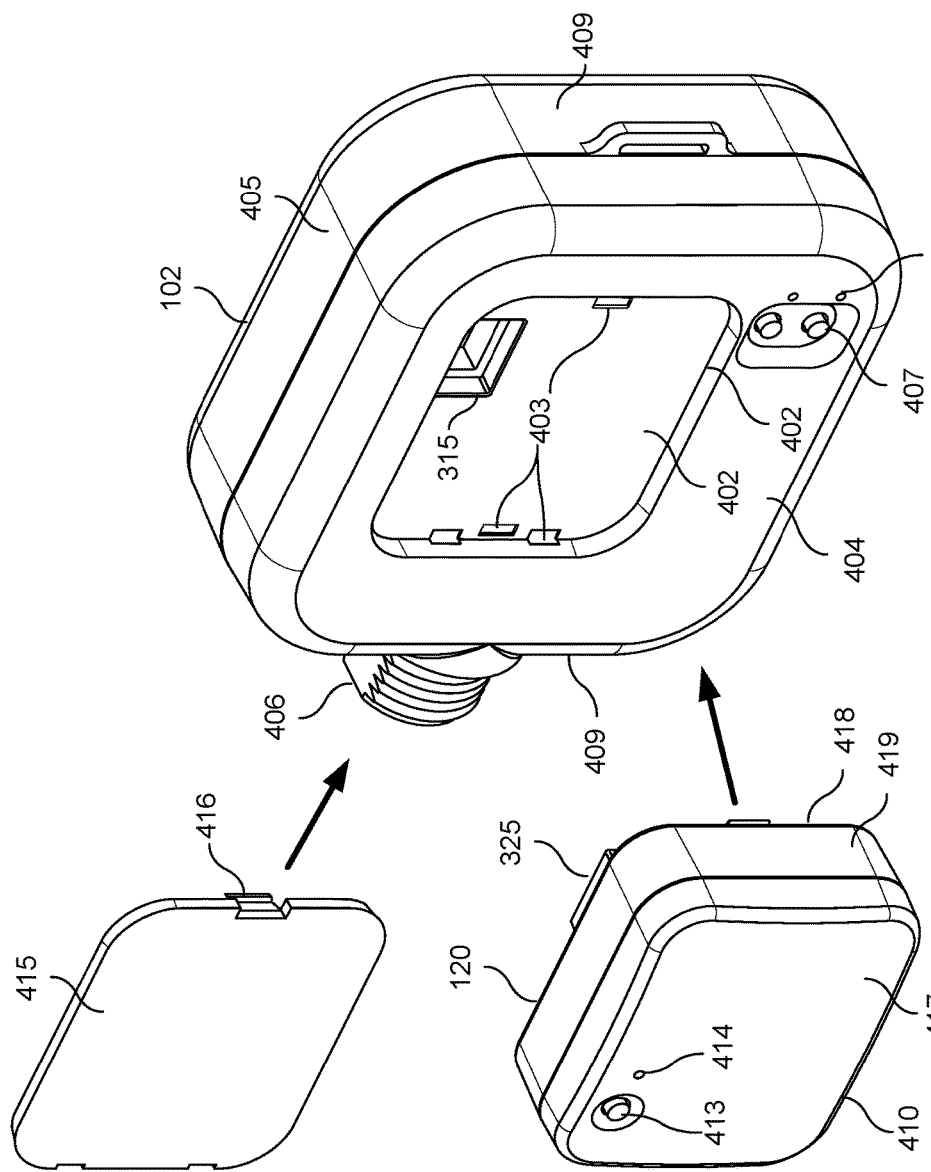

FIG. 4A illustrates a perspective front view of the load controller, a cover, and the network bridge according to an illustrative aspect of the embodiments.

Figure 4B:
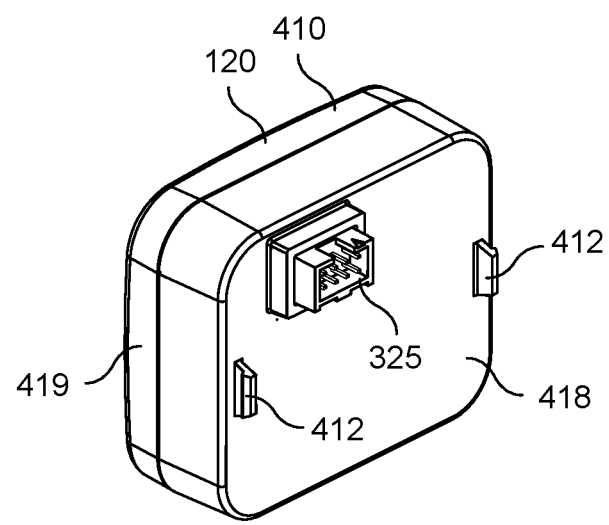

FIG. 4B illustrates a perspective rear view of the network bridge according to an illustrative aspect of the embodiments.

Figure 4C:
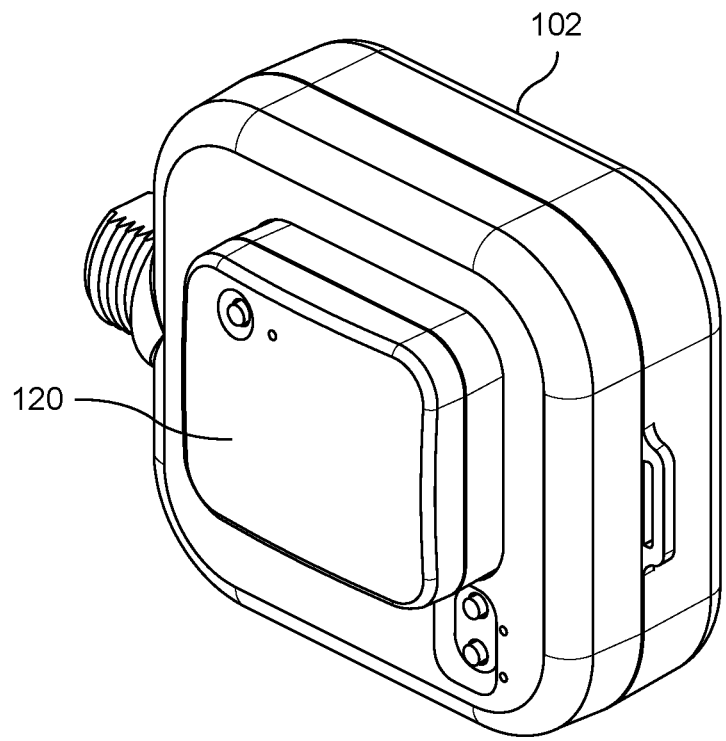

FIG. 4C illustrates a perspective front view of the network bridge connected to the load controller according to an illustrative aspect of the embodiments.

Figure 5:
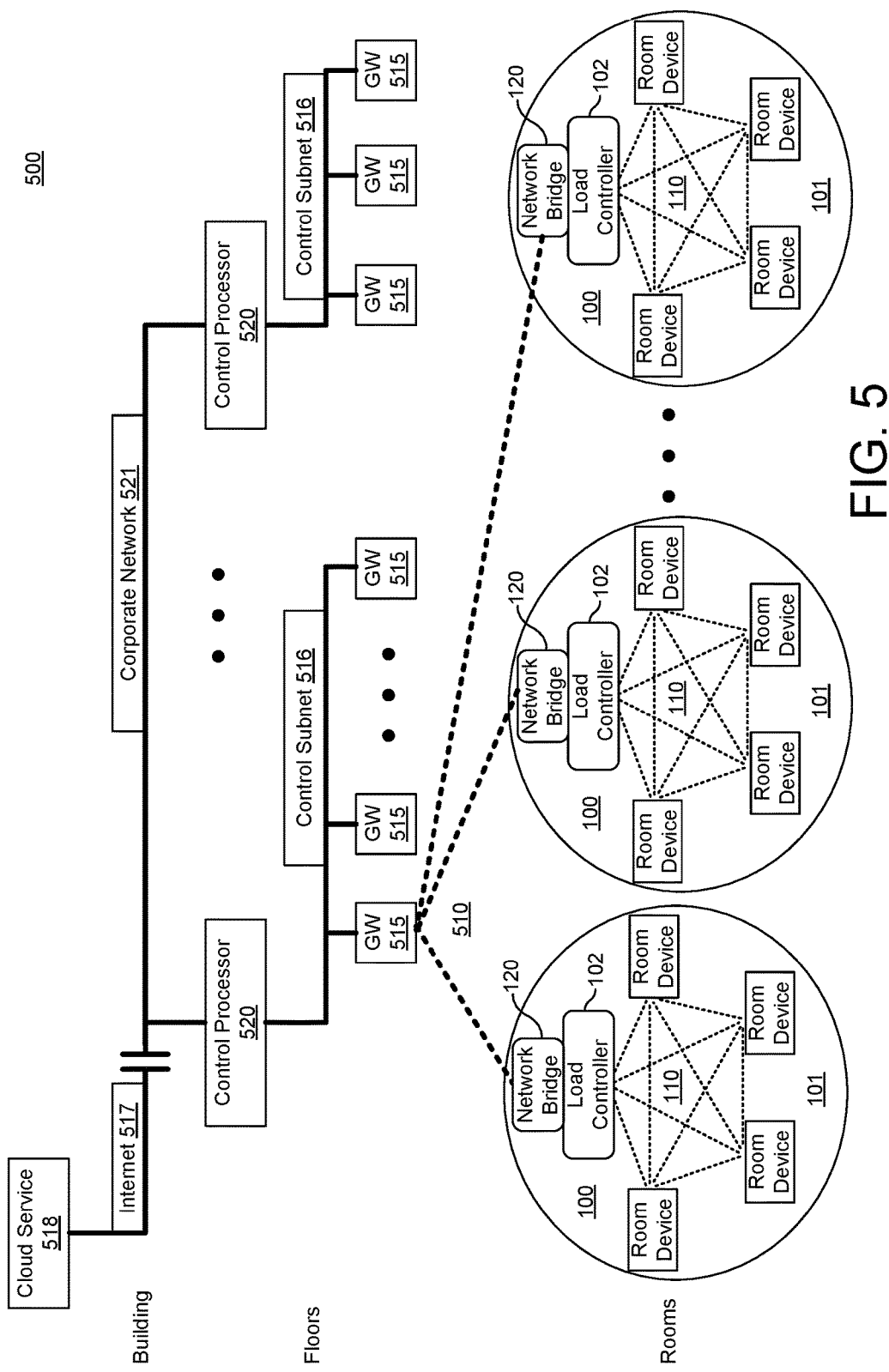

FIG. 5 is an illustrative block diagram of a centralized lighting control system according to an illustrative aspect of the embodiments.

Figure 6:
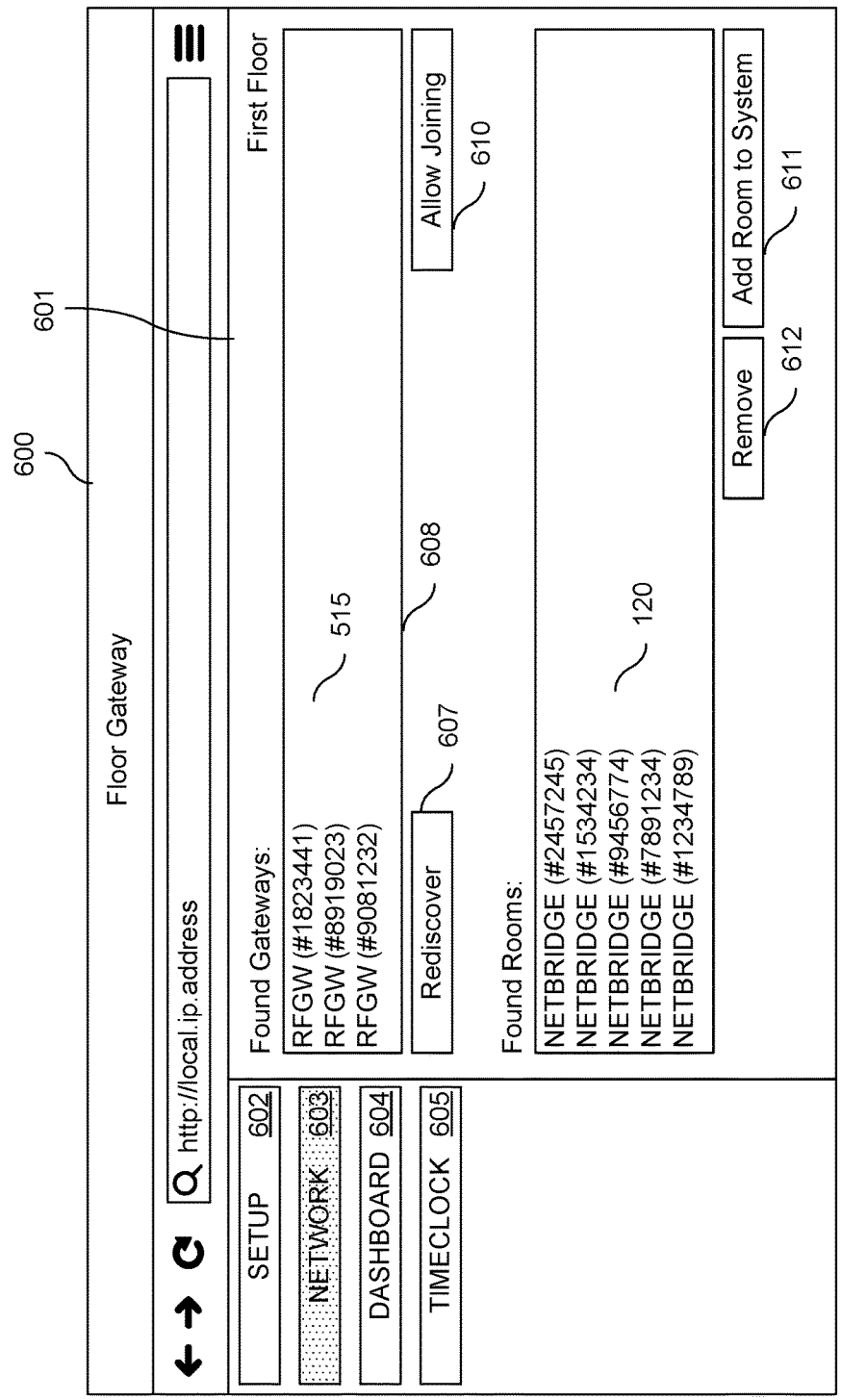

FIG. 6 is an illustrative schematic diagram of a network setup screen according to an illustrative aspect of the embodiments.

Figure 7:
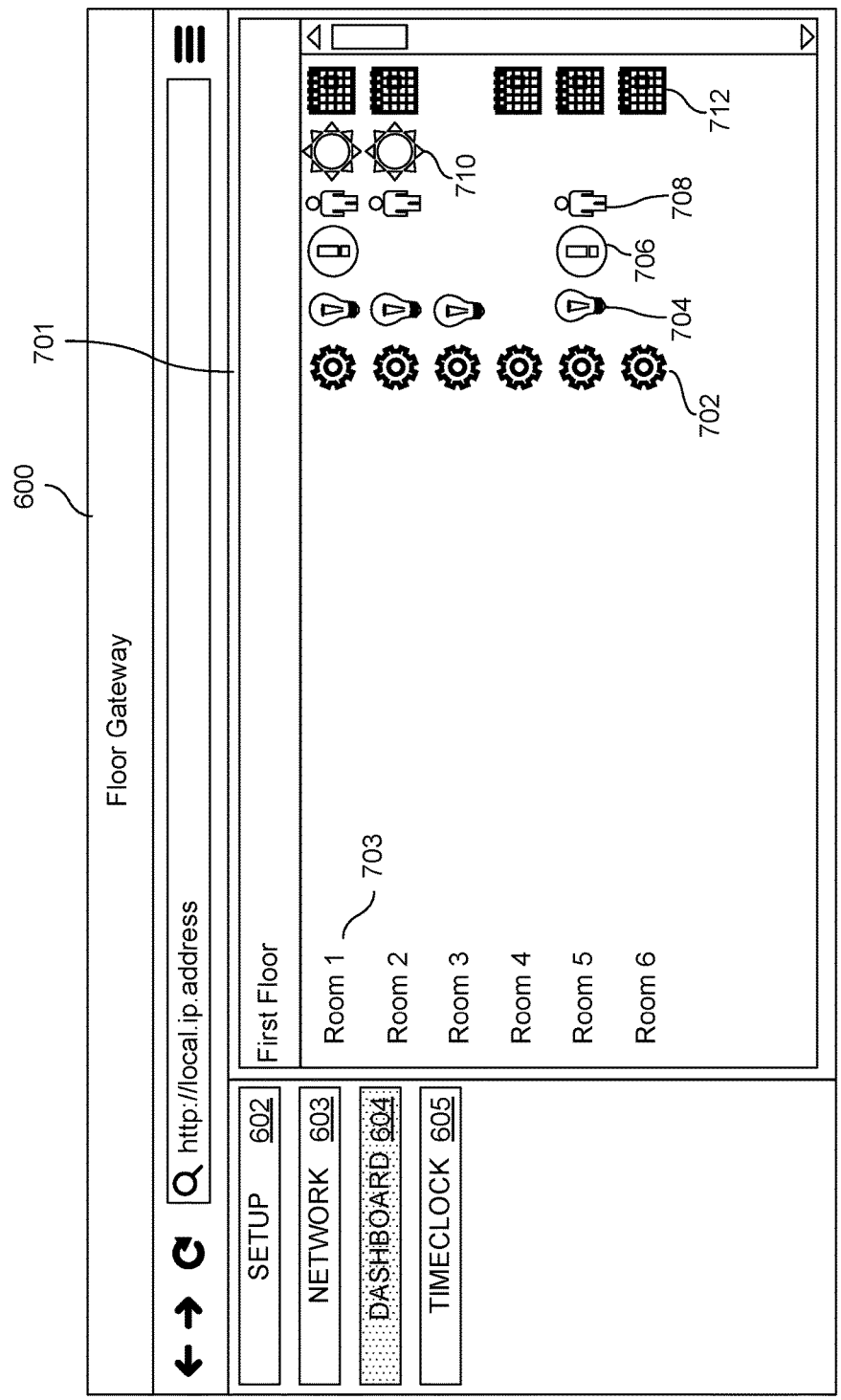

FIG. 7 is an illustrative schematic diagram of a dashboard screen according to an illustrative aspect of the embodiments.

Figure 8:
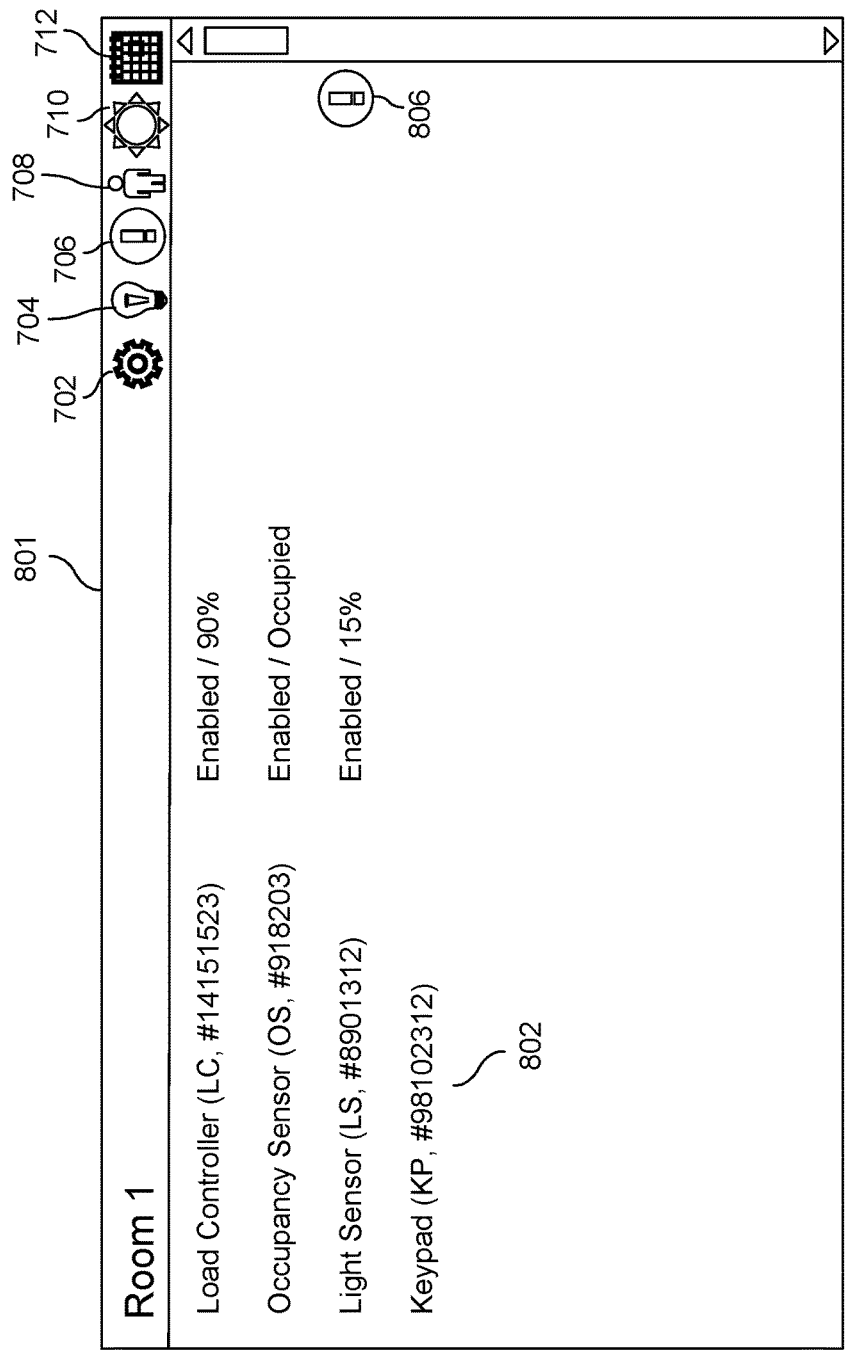

FIG. 8 is an illustrative room rollout window according to an illustrative aspect of the embodiments.

Figure 9:
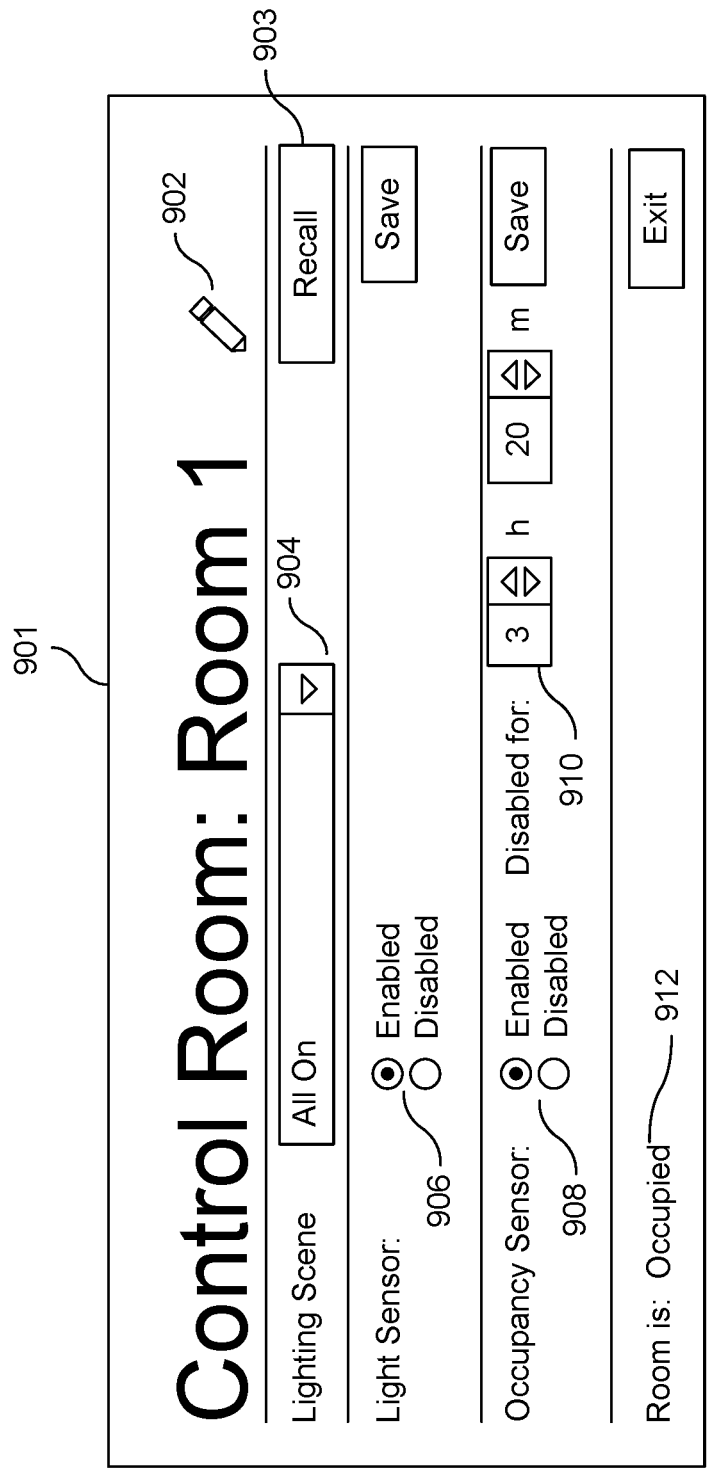

FIG. 9 is an illustrative room control window according to an illustrative aspect of the embodiments.

Figure 10:
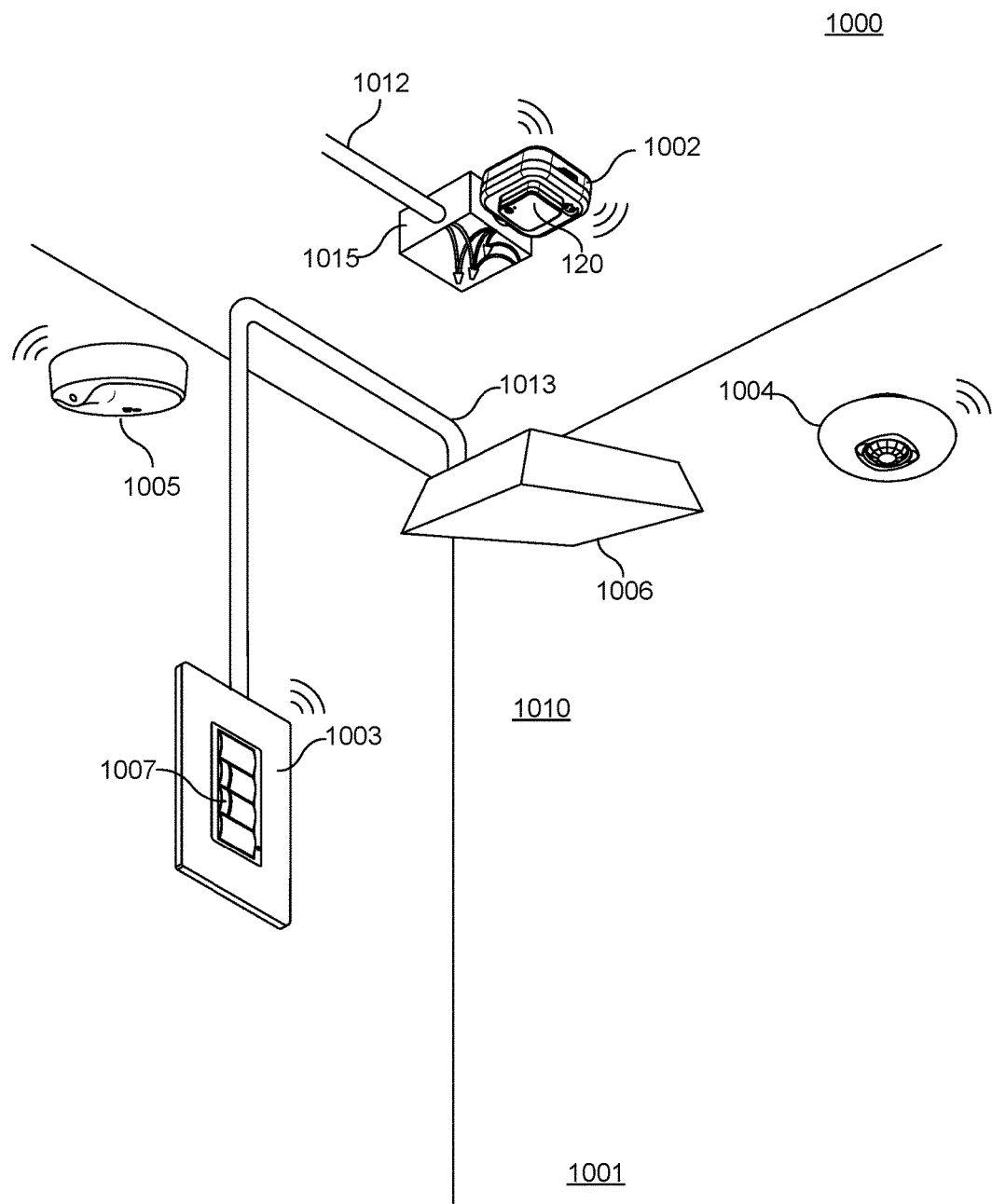

FIG. 10 illustrates another embodiment of a room lighting control system according to an illustrative aspect of the embodiments.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

| | |
|---|---|
| 100 | Room Lighting Control System(s) |
| 101 | Room(s) |
| 102 | Load Controller(s) |
| 103 | Lighting Control Device(s) |
| 104 | Occupancy Sensor(s) |
| 105 | Light Sensor(s) |
| 106 | Lighting Load(s) |
| 107 | Buttons |
| 108 | Receptacle(s) |
| 109 | Light Emitting Diode (LED) |
| 110 | Room Wireless Network |
| 111 | Wire Leads |
| 112 | Voltage Line |
| 113 | Load Line |
| 115 | Junction Box |
| 120 | Network Bridge(s) |
| 122 | Load Controller |
| 125 | Junction Box |
| 201 | Central Processing Unit (CPU) |
| 202 | Wireless Network Interface |
| 204 | User Interface |
| 207 | Memory |
| 209 | Status Light Indicator |
| 210 | Power Supply |
| 301 | Central Processing Unit (CPU) |
| 302 | Wireless Network Interface |
| 304 | User Interface |
| 307 | Memory |
| 309 | Status Light Indicator |
| 310 | General Purpose Input Output (GPIO) |
| 311 | Power Supply |
| 312 | Dimmer |
| 313 | Switch |
| 315 | Port |
| 316 | Alternating Current (AC) Power Signal |
| 317 | Dimmed Voltage Output Signal |
| 318 | Switched Hot Signal |
| 319 | Bridge Interface |
| 321 | Central Processing Unit (CPU) |
| 322 | Wireless Network Interface |
| 323 | Power Regulator |
| 324 | User Interface |
| 325 | Plug |
| 326 | Bluetooth Module |
| 327 | Memory |
| 329 | Status Light Indicator |
| 330 | Room Status Report |
| 331 | Power Signal |
| 332 | Firmware Images |
| 402 | Recess |
| 403 | Cavities |
| 404 | Front Surface |
| 405 | Housing |
| 406 | Threaded Nipple |
| 407 | Buttons |
| 408 | Light Emitting Diodes (LED) |
| 409 | Side Surfaces |
| 410 | Housing |
| 412 | Hooks |
| 413 | Button |
| 414 | LEDs |
| 415 | Cover |
| 416 | Hooks |
| 417 | Front Surface |
| 418 | Rear Surface |
| 419 | Side Surfaces |
| 500 | Centralized Lighting Control System |
| 510 | Centralized Wireless Network |
| 515 | Wireless Gateway(s) |
| 516 | Control Subnet(s) |
| 517 | Internet |
| 518 | Cloud Service/Server |
| 520 | Control Processor(s) |
| 521 | Corporate Network |
| 600 | Webpage |
| 601 | Network Setup Screen |
| 602 | "Setup" Button |
| 603 | "Network" Button |
| 604 | "Dashboard" Button |
| 605 | "Timeclock" Button |
| 607 | "Rediscover" Button |
| 608 | "Found Gateways" List |
| 610 | "Allow Joining" Button |
| 611 | "Add Room To System" Button |
| 612 | "Remove" Button |
| 701 | Dashboard Screen |
| 702 | Gear Icon |
| 703 | List Of Room Names |
| 704 | Light Icon |
| 706 | Error Icon |
| 708 | Occupancy Icon |
| 710 | Light Sensor Icon |
| 712 | Calendar Icon |
| 801 | Room Accordion Rollout Window |
| 802 | In-Room Devices |
| 806 | Error Icon |
| 901 | Room Control Window |
| 902 | Edit Icon |
| 903 | "Recall" Button |
| 904 | "Lighting Scene" Pull Down Menu |
| 906 | Light Sensor Radio Buttons |
| 908 | Occupancy Sensor Radio Buttons |
| 910 | Timeout Selection Fields |
| 912 | Notification Field |
| 1000 | Room Lighting Control System |
| 1001 | Room |
| 1002 | Dedicated Network Bridge Power Supply |
| 1003 | Lighting Control Device and Load Controller |
| 1004 | Occupancy Sensor |
| 1005 | Light Sensor |
| 1006 | Lighting Load |
| 1007 | Buttons |
| 1010 | Room Wireless Network |
| 1012 | Voltage Line |
| 1013 | Load Line |
| 1015 | Junction Box |

LIST OF ACRONYMS USED IN THE SPECIFICATION IN ALPHABETICAL ORDER

The following is a list of the acronyms used in the specification in alphabetical order.

| | |
|---|---|
| AC | Alternating Current |
| ASIC | Application Specific Integrated Circuit |
| AV | Audiovisual |
| BAS | Building Automation System |
| BMS | Building Management System |
| CCO | Contact Closure Output |
| CPU | Central Processing Unit |
| DC | Direct Current |

-continued

| | |
|---|---|
| EMS | Energy Management System |
| GHz | Gigahertz |
| GPIO | General-Purpose Input/Output |
| GUI | Graphic User Interface |
| HVAC | Heating, Ventilation and Air Conditioning |
| Hz | Hertz |
| ID | Identification Number |
| IP | Internet Protocol |
| LAN | Local Area Network |
| LED | Light Emitting Diode |
| mA | Milliamps |
| OTA | Over-The-Air |
| PAN | Personal Area Network |
| PC | Personal Computer |
| PIR | Passive Infrared |
| RAM | Random-Access Memory |
| RF | Radio Frequency |
| RISC | Reduced Instruction Set |
| ROM | Read-Only Memory |
| SPI | Serial Peripheral Interface |
| SSR | Solid-State Relay |
| UID | Unique Identification Number |
| USB | Universal Serial Bus |
| V | Volt |
| WPAN | Wireless Personal Area Network |

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics Inc., located in Rockleigh, N.J.

The different aspects of the embodiments described herein pertain to the context of building control systems, including building automation systems (BAS), building management systems (BMS), and energy management systems (EMS), but are not limited thereto, except as may be set forth expressly in the appended claims. The embodiments of the building management system can be used in small, mid, or large scale residential or commercial installations. While the embodiments are described herein as being implemented for commercial building management, they are not limited to such an implementation. The present embodiments may be employed in other type of venues or facilities, including in residential, retail, or nonprofit structures or venues. Additionally, the building control system described herein may manage and control an entire building and can be scaled up to manage an entire campus of buildings or scaled down to manage a single room, a floor, or a section of a floor, such as a department. Additionally, while the building control system of the present embodiments is described below as monitoring and controlling lighting, the building control system can monitor and control numerous other types of electronic devices, including one or more of heating, ventilation and air conditioning (HVAC), shading, security, appliances, door locks, and audiovisual (AV) equipment, among others.

The present embodiments provide scalable building control system with a modular architecture that can be scaled up from a single room control to a centralized control, for example of an entire building. Such a scalable lighting building control system can include load and receptacle controllers, wall interfaces, and sensors. As will be further described, the system can also include optional gateways, network bridges, and processors for data reporting to allow building manages to exercise centralized control over rooms. The scalable building control system of the present embodiments can be deployed without programming or with only limited and simple programming. Additionally, the scalability of the building control system of the present embodiments makes it easy to design, simple to install, and inexpensive while capable of delivering high value.

Referring to FIG. 1, there is shown a room lighting control system 100 according to one embodiment. The room lighting control system 100 may also be referred to as a zone or a space lighting control system 100. According to an embodiment, the lighting control system 100 can operate as a room-based, standalone system. Lighting control system 100 may be installed in a room 101 and may comprise one or more of the following devices: one or more load controllers 102 and 122, a lighting control device 103, a receptacle 108, an occupancy sensor 104, a light sensor 105, as well as other lighting control devices. The lighting control system 100 may be installed in an office, classroom, conference room, residential room, or the like. The lighting control system 100 may be configured to control one or more lighting loads 106 within room 101 over a room or zone based wireless network 110. A network bridge 120 may be optionally installed in the room lighting control system 100, either during initial installation or anytime at a later date, for scaling up the room lighting control system 100 to a centralized lighting control system for entire building control, as will be further described below.

One or more lighting control devices 103 may be installed in room 101. The lighting control device 103 is configured to serve as a user interface to associated load controllers 102 in a space. In an illustrative embodiment, the lighting control device 103 may be configured to receive control commands directly from a user and wirelessly transmit the control commands to the load controller 102 electrically connected the lighting load 106 to control the lighting load 106 based on the control commands.

The lighting control device 103 may be configured as a switch, a dimmer, a keypad, or another device configured for receiving control commands from a user. A light switch can be used to control the on/off state of the lighting load 106. A dimmer may be configured to control the on/off state of the lighting load 106 as well as to control a dimming level of the load 106. A keypad, such as the lighting control device 103 illustrated in FIG. 1, may comprise a plurality of buttons 107. The buttons 107 may correspond to different lighting scenes, such as a day scene and a night scene, with different dimming modes that may be preconfigured by the user. The buttons 107 may also be configured to control multiple load devices, such as a plurality of lighting loads 106, as well as other type of loads such as shade or drapery devices, heating, ventilation and air conditioning (HVAC) systems, audiovisual (AV) devices, or the like.

FIG. 2 is an illustrative block diagram of a lighting control device 103. The control device 103 may include various circuit components configured for receiving control commands and transmitting commands wirelessly to a load controller 102, or other in-room devices.

Lighting control device 103 may comprise a power supply 210 configured for providing power to the various circuit components of the lighting control device 103. In one embodiment, the lighting control device 103 may be battery operated, for example, via a coin cell battery, such as a BR2032 coin cell battery. As such, the battery powered lighting control device 103 may be attached to any vertical surface, such as a wall, glass, sheetrock, or the like, with tape or mounting adhesive, without the need of a mounting box, wires, or cutouts. The battery powered lighting control device 103 may be also installed to a switch or gang box using screws. In one embodiment, the battery powered lighting control device 103 may comprise similar configuration to the battery powered control device disclosed in U.S. patent application Ser. No. 15/342,639, filed Nov. 3, 2016, and titled "Battery Powered Keypad Assembly," the entire contents of which are hereby incorporated by reference.

In another embodiment, for applications where a battery powered unit is not practical or desired, such as retrofit applications, one or more of the lighting control devices 103 may be powered by an electric alternating current (AC) power signal from an AC mains power source. Such lighting control device 103 may comprise leads suitable for making line voltage connection. The AC powered lighting control device 103 may be installed in a standard switch or gang box using screws. According to an embodiment, such AC powered control devices 103 may not directly control a lighting load 106, but send control commands to a paired load controller 102 via the room wireless network 110. In other embodiments, one or more of the AC powered control devices 103 may be directly wired and control a load within room 101.

The lighting control device 103 may comprise a user interface 204, such one or more buttons 107 (FIG. 1) in communication with micro-switches or tactile switches, through which the lighting control device 103 may receive control commands from a user to control an operation of a load, such as turn the load on or off, increase or decrease light levels of the load, recall a preset setting, or the like. These control commands may be transmitted to the load controller 102 over the room wireless network 110 to control its associated lighting load 106. The buttons 107 may be also used to disable or enable operation of the occupancy sensor 104 or the light sensor 105 in the room. The buttons 107 on the lighting control device 103 may be also used for configuration purposes, such as to command the lighting control device 103 to join a network, bind the lighting control device 103 to other in-room devices, group the lighting control device 103 into a group of in-room devices, enter into a scene setting mode to configure preset lighting scenes, or the like.

The lighting control device 103 may also comprise at least one status light indicator 209, such as a multicolored light emitting diode (LED) 109 (FIG. 1), configured for visually indicating the status of the lighting control device 103 to the user. For example, if a button 107 is pressed, the light indicator 209 may briefly light green. If the battery level is low (e.g., <5% life remaining) the light indicator 209 may blink red three times. The light indicator 209 may also indicate whether the control device 103 is trying to join a network, when it is configured, or the like. Additional status light indicators may also be provided, for example, to identify active switches or dimming levels.

Each lighting control device 103 can further comprise a central processing unit (CPU) 201. CPU 201 can represent one or more microprocessors, and the microprocessors can be "general purpose" microprocessors, a combination of general and special purpose microprocessors, or application specific integrated circuits (ASICs). Additionally, or alternatively, the CPU 201 can include one or more reduced instruction set (RISC) processors, video processors, or related chip sets. The CPU 201 can provide processing capability to execute an operating system, run various applications, and/or provide processing for one or more of the techniques and functions described herein. CPU 201 can process various commands and perform operations requested by the load controller 102, such as allowing the lighting control device 103 to join the room based wireless network 110, receiving and processing user control commands, determining battery voltage levels, or the like.

Each lighting control device 103 can further include a memory 207 communicably coupled to the CPU 201, which can store data and executable code. Memory 207 can represent volatile memory such as random-access memory (RAM), and/or nonvolatile memory, such as read-only memory (ROM) or Flash memory. In buffering or caching data related to operations of the CPU 201, memory 207 can store data associated with applications running on the control processor 201. Memory 207 can store data files, software for implementing the functions on the control processor 201, and wireless connection information to establish the wireless network 110.

Each lighting control device 103 may comprise a wireless network interface 202 configured for bidirectional wireless communication with other in-room devices, such as the load controller 102, on the room based wireless network 110. According to an embodiment, the wireless network interface 202 may comprise a radio frequency (RF) transceiver configured for bidirectional wireless communication over a 2.4 GHz wireless network.

Referring back to FIG. 1, system 100 may further comprise sensors, such as an occupancy sensor 104 and a light sensor 105, which may also be referred to as lighting control devices. Sensors 104-105 may comprise similar components as shown in FIG. 2, including a wireless network interface 202, a CPU 201, and a memory 207. Sensors 104-105 may comprise a power supply 210 and may be battery operated or connected to line voltage. Sensors 104-105 may also comprise a user interface 204, such as one or more buttons, configured for commanding the sensors 104-105 to enter into a test mode, battery check, network joining mode, commissioning mode, configuration mode, such as calibration mode, adjusting sensitivity, adjusting timeout, or the like. Sensors 104-105 may further comprise light indicators 209, such as one or more light emitting diodes (LEDs), to display a status of the sensors 104-105. For example, the light indicator 209 may indicate when the sensor is trying to join a network, when it is configured, when motion is detected, when a battery is low, or the like.

An occupancy sensor 104 detects the occupancy state of the room 101 and generates an occupancy signal based on the occupancy state of that monitored area. For example, the occupancy sensor 104 can generate a binary signal with one logical level representing an occupied state and the another logic level representing a vacant state. Occupancy sensor 104 may include various circuit components, as discussed above, configured for receiving control commands and transmitting commands wirelessly to a load controller 102, or other in-room devices. Each occupancy sensor 104 can further comprise an occupancy sensing module, such as a passive infrared (PIR) element, configured to detect motion. A Fresnel lens covers the infrared sensor for focusing the light to the infrared sensor and dividing the field-of-view into sensor zones. The infrared element may generate a signal based on sensed infrared radiation of the monitored area. The signal from the detector may be fed through low pass filters and into a window comparator. Motion will trigger the signal to move outside window comparator threshold and generate an interrupt to wake the CPU of the sensor 104. In addition, or alternatively, each occupancy sensor can comprise an ultrasonic sensor to detect motion.

Occupancy determinations can be dependent on a number of settings of the occupancy sensor, which can be preconfigured or configured through physical interfaces on the occupancy sensor 104 or remotely via a graphic user interface (GUI) or remote control. Additionally, sensitivity settings can be determined according to one or more factors such as time event, including time of day, day of week or month of year, a scheduled event, the current occupancy state of the monitored area, or the occupancy state of another area. The sensitivity setting can be determined either locally at the occupancy sensor or at a network device and transmitted to the occupancy sensor. For example, the timeout period of the occupancy sensor can be set. Additionally, the sensitivity of the individual sensors can be set. Finally, the physical direction of the sensors operational range can be set by altering a mask of the occupancy sensor.

Occupancy sensor 104 may be configured to operate in various modes, such as an "Occupancy" mode, a "Vacancy" mode, or can be switched between the two depending upon implementation. For example, the sensor 104 may contain a dedicated button, or a button combination, configured for toggling the sensor 104 between the "Occupancy" mode and the "Vacancy" mode. In the "Occupancy" mode, lights are generally off. Lights automatically turn on when the room is occupied and automatically turn off when the room is vacant. During the "Occupancy" mode, lights will remain on for as long as motion is detected by the occupancy sensor 104. In the "Vacancy" mode, lights are generally off and must be manually turned on via the lighting control device 103 by someone walking into the room. After the occupancy sensor detects occupancy, the occupancy sensor 104 is configured to detect vacancy—i.e., whether the room has been vacated. The lights automatically turn off when the room becomes vacated.

A light sensor 105 may be configured for detecting and measuring natural light intensities in the room 101 to enable daylight harvesting applications. Light sensor 105 may monitor natural daylight from windows and communicate the detected light intensity to the load controller 102. The load controller 102 may raise or lower the lighting load 106 according to natural light fluctuations, reducing energy usage while maintaining a consistent light level for a more efficient and comfortable work or living space. Light sensor 105 may include various circuit components, as discussed above, configured for receiving control commands and transmitting commands wirelessly to a load controller 102, or other in-room devices. In addition, the light sensor 104 may comprise a light sensing module configured for detecting light levels. According to an embodiment, light sensor can comprise a dual-loop photosensor having two internal photocells with 0-65535 lux (0-6089 foot-candles) light sensing, one for open-loop daylight sensing and one for closed-loop ambient light sensing to measures light intensity from natural daylight and ambient light sources. The light sensor 105 may comprise a sideways facing sensor to determine sunlight levels. The light sensor 105 may be installed near a sunlit window with the open-loop sensor (or side sensor) facing the window.

The lighting control system 100 may further comprise other types of sensors, such as infrared sensors, photosensors, ultrasonic sensors, various motion sensors, occupancy sensors, proximity sensors, sound sensors, microphones, ambient temperature sensors, or the like.

The lighting control system 100 may further comprise one or more load or zone controllers 102 and 122 installed in the room 101. Load controller 102 may receive control messages from in-room devices, such as the lighting control device 103, occupancy sensor 104, and light sensor 105, in the room lighting control system 100 to control its associated lighting load 106. Although a single load controller 102 is illustrated, the lighting control system 100 may comprise a plurality of load controllers, such as load controllers 102 and 122, connected to respective loads within room 101. Each load controller 102 may be grouped with particular control devices 103, occupancy sensors 104, and light sensors 105 located within room 101.

Each load controller 102 may be mounted to a conventional four-inch junction box 115 in the ceiling via a conduit knockout and may comprise a plurality of wire leads 111 extending into the junction box 115. The load controller 102 may comprise a hot wire and a neutral wire connected via a voltage line 112 to an alternating current (AC) power source, such as an AC mains power source, to receive electric AC power signal. In an embodiment, the AC power source may comprise 120 Volt (V) 60 Hertz (Hz) AC mains residential power supply. In other embodiments, the AC power source may supply power at a different voltage and/or frequency. For example, in another embodiment, the AC power source may supply 220V 50 Hz AC mains power supply. The load controller 102 may be further connected to a lighting load 106 via load line 113 to control the lighting load 106 in response to messages received from in-room devices, such as the lighting control device 103, occupancy sensor 104, and light sensor 105.

In an alternative embodiment, instead of using a hard wired configuration, the load controller 102 may comprise a plug-in configuration. The load controller 102 may comprise a plug for connection to a wall receptacle to receive electric AC power signal from an AC power source. Additionally, the load controller 102 may comprise a receptacle for receiving a plug from a lighting load 106.

In various embodiments, the load controller may be connected to control the operation of other types of loads, including HVAC, shading, security, appliances, door locks, AV equipment, among others. For example, load controller 122, with similar configuration to load controller 102, may be electrically connected to a receptacle 108 via junction box 125 to power the receptacle 108 on or off. Certain building codes require certain percentage of receptacles to be switched off when the room is unoccupied. The load controller 122 connected to the receptacle 108 may turn off power to the receptacle 108 when the room 101 becomes vacant and turn back on when the room 101 becomes occupied, as reported by the occupancy sensor 104. Load controller 122 may transmit its status information to the network manager, such as load controller 102.

FIG. 3 is an illustrative block diagram of a load controller 102 (including load controller 122). The load controller 102 may include various circuit components configured for receiving commands and transmitting commands wirelessly to various in-room devices, such as other load controllers, the lighting control device 103, occupancy sensor 104, and light sensor 105. The load controller 102 may comprise a power supply 311 connected to the voltage line 112 for receiving an electric AC power signal 316 from an AC mains power source. The power supply 311 may comprise circuit components configured for converting the incoming AC power signal to a direct current (DC) power signal. For example, the power supply 311 may comprise a bridge rectifier that rectifies the AC voltage signal and converts it into a rectified DC voltage signal. The bridge rectifier may comprise four or more diodes in a bridge circuit configuration which provides the same polarity output for either polarity input of the AC signal. The power supply 311 may also comprise a power regulator configured for maintaining a substantially constant voltage level to stabilize the DC voltage signal used by the circuit elements of the load controller 102.

The load controller 102 may comprise a user interface 304, such one or more buttons, configured for commanding the load controller 102 to enter into a test mode, a setup mode, or the like. For example, the buttons may be used to command the load controller 102 to form the room wireless network 110 or join an existing room wireless network 110. The load controller 102 may further comprise a status light indicator 309, such as one or more LEDs, for use during setup, maintenance, troubleshooting, or the like. For example, the status light indicator 309 can indicate the current state of the lighting load 106.

The load controller 102 can further comprise a CPU 301. CPU 301 can represent one or more microprocessors, and the microprocessors can be "general purpose" microprocessors, a combination of general and special purpose microprocessors, or ASICs. Additionally, or alternatively, the CPU 301 can include one or more RISC processors, video processors, or related chip sets. The CPU 301 can provide processing capability to execute an operating system, run various applications, and/or provide processing for one or more of the techniques and functions described herein. CPU 301 can process various commands and perform operations in response to messages received from in-room devices to control the lighting load 106.

The load controller 102 can further include a memory 307 communicably coupled to the CPU 301, which can store data and executable code. Memory 307 can represent volatile memory such as RAM, but can also include nonvolatile memory, such as ROM or Flash memory. In buffering or caching data related to operations of the CPU 301, the memory 307 can store data associated with applications running on the control processor 301. Memory 307 can store data files, software for implementing the functions on the control processor 301, and wireless connection information to establish the wireless network 110.

The load controller 102 may further comprise a wireless network interface 302 configured for bidirectional wireless communication with other in-room electronic devices, such as the lighting control devices 103 and light sensors 104, over the room based wireless network 110. The wireless network interface 302 may comprise a radio frequency (RF) transceiver configured for bidirectional wireless communication over a 2.4 GHz wireless network.

The load controller 102 may be a dimming load controller and/or a switching load controller. The load controller may comprise a switch 313 configured for switching a connected lighting load 106, or other load type, on or off by providing a switched hot signal 318 to the load. According to one embodiment, switch 313 may comprise an electromechanical relay configured for switching the lighting load 106 on or off. An electromechanical relay may use an electromagnet to mechanically operate a switch. In another embodiment, a solid-state relay (SSR) may be used to switch the lighting load 106 on or off. The SSR may comprise semiconductor devices, such as thyristors (e.g., TRIAC) and transistors, to switch currents up or down.

In addition, or alternatively, the load controller 102 may comprise a dimmer 312 configured for providing a dimmed voltage output signal 317 to a connected lighting load 106. For example, the dimmer 312 of the load controller 102 may reduce its output based on sunlight levels reported by the light sensor 104. According to an embodiment, the dimmer 312 may comprise a solid-state dimmer for dimming different types of lighting loads 106, including incandescent, fluorescent, LED, or the like. According to an embodiment, the dimmer 312 may comprise a 0-10V DC dimmer to provide a dimmed voltage output to an LED lighting load, a fluorescent lighting load, or the like. In one embodiment, the dimmer 312 may comprise the sinking and sourcing dimmer circuit disclosed in U.S. patent application Ser. No. 15/336,381, filed Oct. 27, 2016, and titled "Dimmer Configured for Providing Sinking and Sourcing, Current Outputs," the entire contents of which are hereby incorporated by reference.

The load controller 102 may further comprise a port 315, such as a Serial Peripheral Interface (SPI) port, a Universal Serial Bus (USB) port, or the like. Port 315 may be configured for connecting the load controller 102 to a network bridge 120 as will be further described below.

In another embodiment, the port 315 may be used to connect the load controller 102 to other types of systems. The port 315 may comprise a general-purpose input/output (GPIO) generic pin 310 configured for connecting the load controller 102 to other types of systems. For example, the GPIO pin 310 may be used to connect the load controller 102 to a relay module, such as a Contact Closure Output (CCO) relay module. The relay module may plug into the port 315 on any load controller the same way as discussed below with respect to the network bridge 120. The relay module may be used to provide control commands to other type of building equipment, such as an HVAC controller. The relay module may provide an optional contact closure interface to inform other system of the state of the room 101, i.e., occupied or vacant. This may be used to enable or disable HVAC in the room. For example, the load controller 102 may drive the relay module on when it receives an occupied state and drive the relay module off when it receives a vacant state based on the reported occupancy sensor state.

In another embodiment, the GPIO pin 310 may be used to connect the load controller 102 to an Audiovisual (AV) bridge to enable interactions between an AV system and the room control system 100. The AV bridge may comprise an interface for communication to an AV system, such as an RS-232 serial port. Through the GPIO pin 310 the load controller 102 may provide the state of the room 101, such as its vacancy/occupancy status, light levels, light scenes, or the like, to an AV system. Additionally, the load controller 102 may receive control commands from the AV system, for example, to recall a lighting scene, ignore sensor output for a defined period of time, raise or lower light levels, or the like.

Referring to FIG. 1, the various in-room devices, including the load controllers 102 and 122, lighting control device 103, occupancy sensor 104, and light sensor 105, may intercommunicate with each other using the room based wireless network 110. In one embodiment, the room wireless network 110 can comprise one or more wireless personal area networks (WPANs). The room wireless network 110 may comprise a peer-to-peer wireless network, for example, such that sensor 104 on the ceiling can directly communicate with load controller 102 or lighting control device 103. The room wireless network 110 may comprise a 2.4 GHz peer-to-peer radio frequency (RF) mesh network topology, where every in-room device may act as an "expander", relaying wireless commands directly between the in-room devices until the commands reach their intended destination. Each in-room device that is added to the room 101 increases the range and stability of the peer-to-peer mesh network by providing multiple redundant signal paths. According to an embodiment, the wireless range between any two in-room devices in the room wireless network 110 may comprise a range of about 50 ft.

In an embodiment, the room wireless network 110 of the lighting control system 100 between the in-room devices is automatically formed upon installation during a wireless network initialization process. The in-room devices can communicate directly with each other via a pairing process—e.g., tapping buttons on the load controllers 102/122, lighting control device 103, occupancy sensor 104, and light sensor 105 links these devices together to form the in-room wireless network 110.

According to an embodiment, each load controller in room 101 may act as a router and can take the role of the network coordinator configured for forming the in-room wireless network 110. In rooms with more than one load controller, one load controller, such as load controller 102, may be assigned to be the network coordinator. The load controller 102 may contain a button which commands it to form the network 110. In response, the load controller 102 will act as the network coordinator and will pick the best channel and select a random personal area network (PAN) identification number (ID) that will be used for message exchange over the room wireless network 110. The load controller 102 will then establish the room wireless network 110 and may then permit the other in-room devices to join the network 110. To join the room based network 110, the other in-room devices can comprise dedicated buttons, or button combinations, configured for commanding the devices to join the network 110. In response, the devices will initiate a network scan to search for best available network. If a network is available and permits devices to join it, the in-room device will perform an association to that network, for example by sending a join request to the network coordinator and receiving a join confirmation message from the network coordinator. According to an embodiment, the in-room device will undergo a security procedure for authentication. If authentication is successful, the in-room device can start acting as an end device.

According to an embodiment, initially the load controller 102 that forms the network (i.e., the network coordinator) may act as network manager. The network manager may act as a trust center for newly joining devices, take part in routing or re-broadcasting messages, and change channel and notify other in-room devices to change channel based on detection of interference. The load controller 102 acting as network manager may broadcast network manager synchronization messages to notify other load controllers in the room 101 (e.g., 122) that it is still active and acting as a network manager. This will help other load controllers 122 to detect whether the network manager is alive or not.

Other load controllers in the room 101, such as load controller 122, may act as routers by routing messages between in-room devices, taking part in re-broadcasting messages, and notifying the network manager in cases of interference detection. Load controllers that are not network managers may discover and synchronize with the network manager and act as trust centers for newly joining devices. Load controllers that act as routers can act as a backup network manager if the coordinator dies or becomes not functional. These load controllers may detect loss of a network manager, for example, upon losing a predetermined number of consecutive network manager synchronization messages from an active network manager, and in response, take up the role of a network manager and notify other in-room devices about its new role.

After network formation, the lighting control system 100 can function as a standalone room based control system within a single room 101 such that the system 100 can respond to sunlight levels, occupancy, button presses, and any integration points through a corresponding load controller 102.

The load controller 102 may maintain a room status report 330 (FIG. 3) in its memory 307 including information about the in-room devices of the room lighting control system 100. Each in-room device may comprise a unique identification number (UID). During the configuration process, as well as during the operation of the room lighting control system 100, each in-room device may report its UID to uniquely identify itself to the load controller 102. The load controller 102 may maintain an inventory of the various in-room devices in room 101 according to their UIDs in its memory 307. In various aspects of the embodiments, the load controller 102 may record in the room status report 330 one or more of the following: the RF channel of the room wireless network 110, the number of total in-room devices located in the room 101, the number of loads located in the room 101, the UID of each in-room device, and the grouping or binding states of the in-room devices. The load controller 102 may further record attribute data of each in-room device indicating the device type (i.e., sensor, control device, or the like), model name/number, serial number, the type of available device outputs and user inputs or settings it has available, or the like. According to an embodiment, the device type may be used to represent the capabilities of the device without having to look them up against a list of model numbers, such as all in-room devices have preset capabilities. For example, for a lighting control device 103, the load controller 102 may record that it has an on/off operation, various scene settings, a dimming operation, or the like.

During operation, the load controller 102 may keep track of the status of the room 101 as reported by the various in-room devices and record the status in the room status report 330. For example, the load controller 102 may record the status of the load (e.g., on/off and current level that may be expressed as an analog value), daylight status of the room 101 (e.g., illuminance measurement), occupancy status of the room 101 (e.g., occupied/vacant), the operating status of the in-room device (e.g., error, battery level, etc.), or the like. Sleepy devices in room 101 may periodically send check-in messages to the load controller 102 to inform the load controller 102 that the device is still alive and working, inform of its status, battery level, error reporting, or the like. The check-in can also be triggered by a button press on the in-room device. For example, the load controller 102 can keep track of the occupancy and vacancy messages received from each occupancy sensor 104 in an occupancy table and maintain the current state of each occupancy sensor 104 (i.e., occupied or vacant). During operation, in response to receiving a room occupied signal, the load controller 102 may turn the lighting load 106 on. In response to receiving a room vacancy signal from all the occupancy sensors 104 that previously reported a room occupied state, the load controller 102 may turn its respective lighting load 106 off.

The standalone room lighting control system 100 shown in FIG. 1 is configured to operate as part of a centralized lighting control system via an addition of a network bridge 120. Without the network bridge 120, the room lighting control system 100 within room 101 stands alone. For example, as shown in FIG. 1, it can work as a standalone room lighting system 100 in a conference room 101 where the load controller 102 receives messages from the wireless lighting control devices 103 and sensors 104-105 and control its associated lighting load 106, outlet 108, or other types of loads, accordingly. A plurality of standalone room lighting control systems 100 can be scaled up to a centralized lighting control system via the addition of a network bridge 120 to each such lighting control system 100. The network bridge 120 connects to the load controller 102 to provide an interface for centralized monitoring, management and control of individual room lighting control system 100 throughout a building. Accordingly, each room or space in a building comprising a load controller 101 and a network bridge 120 becomes a node of a centralized lighting control system. Each network bridge 120 provides a single point of control and reporting for each connected room or space. According to an embodiment, the network bridge 120 adds a second wireless network interface to the load controller 102 to connect the load controller 102 to a separate wireless network, on top of the room wireless network 110. As such, each network bridge 120 in each room provides the ability for multiple room lighting control systems 100 to be monitored and controlled by a centralized lighting control system, allowing the system to grow exponentially and to be managed centrally. Beneficially, the cost of transforming the room lighting control system 100 into a centralized lighting control system is only incurred when a customer adds the network bridge 120.

Reference is now made to FIGS. 4A-4C, where FIG. 4A illustrates a perspective front view of the load controller 102, a cover 415, and the network bridge 120, FIG. 4B illustrates a perspective rear view of the network bridge 120, and FIG. 4C illustrates a perspective front view of the network bridge 120 connected to the load controller 102. The load controller 102 may comprise a rectangular housing 405 comprising a front surface 404, a rear surface (not shown), and side surfaces 409. The housing 405 may be made of plastic, or any other material known in the art. According to an embodiment, the housing 405 may be sized and dimensioned to fit within a standard junction box. Accordingly, the load controller 102 may be mounted within a junction box adjacent to junction box 115 when required by code. A side surface 409 of the housing 405 may comprise a threaded nipple 406 extending therefrom and configured for fitting through a conduit knockout in the junction box 115 to secure the load controller 102 to the junction box 115, for example, via a screw nut. The front surface 404 of the housing 405 may comprise buttons 407 as the user interface 304 and LEDs 408 as the status light indicator 309 discussed above.

The front surface 404 of housing 405 of the load controller 102 may further comprise a rectangular shaped recess 402 containing the port 315 and cavities 403. When the network bridge 120 is not in connected, the recess 402 of the load controller 102 may be covered via a cover 415 containing hooks 416 configured to be retained by the cavities 403 in the recess 402. The cover 415 may be removed to connect the network bridge 120 to the load controller 102.

The network bridge 120 may comprise a rectangular housing 410 comprising a front surface 417, a rear surface 418, and side surfaces 419. The front surface 417 of the housing 410 may comprise a user interface, such as a button 413, and a status light indicator, such as an LED 414. The rear surface 418 of the housing 410 may comprise a plug 325 and hooks 412. Plug 325 may comprise an SPI plug, a USB plug, or the like.

According to an embodiment, to connect the network bridge 120 to the load controller 102, the housing 410 of the network bridge 120 is at least partially inserted into recess 402 of the load controller 102, as shown in FIG. 4C. The housing 410 of the network bridge is sized and dimensioned to be recessed within the recess 402 of the housing 405 of the load controller 102. The plug 325 of the network bridge 120 connects to port 315 of the load controller 102 allowing bidirectional communication between the two components. The hooks 412 of the network bridge 120 are retained by the cavities 403 of the load controller 102 to maintain the network bridge 120 connected to the load controller 102. Although a rectangular junction box 102 and network bridge 120 are illustrated, other shapes may also be used. Alternatively, the load controller 102 may contain the plug 325 and the network bridge 120 may contain the port 315.

Referring to FIG. 3, there is shown an illustrative block diagram of the network bridge 120. The network bridge 120 may comprise a plug 325, as discussed above, such as an SPI plug, a USB plug, or the like. Plug 325 of the network bridge 120 is configured for connecting to port 315 of the load controller 102 via a bridge interface 319, such as a bus interface, to provide electrical communication between the network bridge 120 and the load controller 102. The network bridge 120 may further comprise a power regulator 323 configured for maintaining a substantially constant voltage level to stabilize the DC voltage signal used by the circuit elements of the network bridge 120. According to an embodiment, the power regulator 323 receives a power signal 331 from the power supply 311 of the load controller 102 through the bridge interface 319. As such, the load controller 102 is configured to provide power to the network bridge 120. The power signal 331 may comprise a 60 mA, 3.3V power signal.

The network bridge 120 may further comprise a user interface 324, such as a button 413, configured for commanding the network bridge 120 to enter into a test mode, a setup mode, a commissioning mode, or the like. The network bridge 120 may further comprise a status light indicator 329, such as an LED 414, for use during set up, maintenance, and troubleshooting.

The network bridge 120 further comprises a wireless network interface 322 configured for bidirectional wireless communication with a centralized wireless network. The wireless network interface 322 may comprise a radio frequency (RF) transceiver configured for bidirectional wireless communication over a 2.4 GHz wireless network.

The network bridge 120 can further comprise a CPU 321. CPU 321 can represent one or more microprocessors, and the microprocessors can be "general purpose" microprocessors, a combination of general and special purpose microprocessors, or ASICs. Additionally, or alternatively, the CPU 321 can include one or more RISC processors, video processors, or related chip sets. The CPU 321 can provide processing capability to execute an operating system, run various applications, and/or provide processing for one or more of the techniques and functions described herein. CPU 321 can process various commands and perform operations in response to messages received from the CPU 301 of the load controller 102 or from the building wide network through the wireless network interface 322.

The network bridge 120 can further include a memory 327 communicably coupled to the CPU 321, which can store data and executable code. Memory 327 can represent volatile memory such as RAM, but can also include nonvolatile memory, such as ROM or Flash memory. In buffering or caching data related to operations of the CPU 321, the memory 327 can store data associated with applications running on the control processor 321. Memory 327 can store data files and software for implementing the functions on the control processor 321.

The network bridge 120 may further comprise a Bluetooth module 326 configured for allowing connection with a mobile device, such as a smartphone, a tablet, or the like. The mobile device may comprise a proprietary mobile application or app configured for connecting the mobile device to the network bridge 120 via the Bluetooth module 326. The mobile application may be used to commission the room wireless network 110 and configure or setup the in-room devices. For example, with the mobile application, installers can set scenes, create scheduled events, and set up sensors. The network bridge 120 may query the load controller 102 for the room status report 330 stored on the memory 307 of the load controller 102 and deliver this information to the mobile application via the Bluetooth module 326, which can be used for room monitoring, configuration, and control. According to various aspects of the embodiments, the mobile application may comprise similar screens with similar setup and control functionally as illustrated in FIGS. 8 and 9 and described below.

Referring to FIG. 5, there is shown an illustrative block diagram of a centralized lighting control system 500 according to an illustrative aspect of the embodiments. The addition of network bridges 120 to a plurality of rooms 101 allows the plurality of individual room lighting control systems 100 to be monitored and centrally controlled by a centralized lighting control system 500. The centralized control system 500 may connect a few room lighting control systems 100, or may be scaled up to connect room lighting control systems 100 of an entire floor, building, campus, or global corporate offices. According to an embodiment, each network bridge 120 connects its corresponding load controller 102 to the centralized lighting control system 500 over a centralized wireless network 510.

The centralized wireless network 510 may comprise one or more wireless personal area networks (WPANs). Communication protocols may govern the operation of centralized wireless network 510 of the centralized control system 500 by governing network formation, communication, interferences, and other operational characteristics. The centralized wireless network 510 may comprise a 2-way 2.4 GHz radio frequency mesh network. Every wireless device on the centralized wireless network 510, including the network bridges 120 and wireless gateways 515 may act as an expander to relay wireless commands ensuring every commands reaches its intended destination. Accordingly, each device that is added to the centralized wireless network 510 increases the range and stability of the entire network by providing multiple redundant signal paths. According to an embodiment, the wireless range between any two devices in the centralized wireless network 510 may comprise a range of about 150 ft.

According to an embodiment, the room wireless network 110 and the centralized wireless network 510 may operate on different protocols, different power strengths, different channels, different latency, different bandwidth, or the like. According to an embodiment, the room wireless networks 110 may comprise a low latency low bandwidth wireless network configured for real-time communication of data between in-room devices. Accordingly, messages between in-room devices may be transmitted quickly for near immediate control of the room 101. On the other hand, the centralized wireless network 510 may comprise a high latency high bandwidth wireless network configured for transmitting large amount of data over the centralized wireless network 510 to a plurality of rooms 101. Because of the modular architecture of the centralized lighting control system 500, no real-time behavior is required by the centralized wireless network 510—enabling large amount of data to be transmitted over the centralized wireless network 510 to control the operation of the individual rooms 101 while not effecting the real-time operation of the in-room devices.

The plurality of network bridges 120 get rolled upon into the centralized management platform that can run on one or more control processors 520, but could equally be implemented on a personal computer (PC). For example, a building may comprise a plurality of control processors 520, which may also be referred to as floor gateways or floor control hubs, with one or more control processors 520 located on each floor of the building for central floor control. Each control processor 520 may provide a single point of control for a plurality of room lighting control systems 100.

Each control processor 520 may comprise a central processing unit (CPU), a memory, and a plurality of network interfaces. According to an embodiment, each control processor 520 can further include a wireless network interface configured for communication with one or more network bridges 120 over the centralized wireless network 510 to network, manage, and control a plurality of network bridges 120. According to another embodiment, the control processor 520 may include one or more communication network interfaces configured for communication over a control subnet 516 with one or more intermediate wireless gateway devices 515, which in turn communicate with one or more network bridges 120 over the centralized wireless network 510. The one or more communication network interfaces may be further configured for communication over a corporate network 521 and/or the Internet 517. According to an embodiment, the communication network interface may be an Ethernet interface for sending and receiving signals over an Internet Protocol (IP) based network.

The network bridges 120 operate on the centralized wireless network 510 by joining the network 510 and being acquired by the control processors 520 during a wireless network initialization. According to one embodiment, each control processor 520 may comprise a wireless network interface configured for directly connecting the network bridges 120 to the control processor 520 over the centralized wireless network 510. In another embodiment, the centralized wireless network 510 may comprise one or more intermediate devices, such as routers or wireless gateways 515 comprising wireless network interfaces that wirelessly connect to the network bridges 120 via the centralized wireless network 510. Each control processor 520 may be connected to one or more intermediate wireless gateways 515 via a control subnet 516, such as a local area network (LAN). In addition, wireless expanders can be added wherever needed to extend the centralized wireless network 510 by filling-in gaps between devices.

Each network bridge 120 may be configured in a "ready to join network mode" such that as soon as it is connected to and powered by the load controller 102, it will enter an acquire mode. Once a control processor 520 enters an acquire mode, the centralized wireless network 510 may form. To initiate the acquire mode, a commissioning agent may manually interact with the control processor 520 to form the centralized wireless network 510. The control processor 520 may broadcast an invitation message, and network bridges 120 within earshot may connect to the control processor 520. In the instance a network bridge 120 may be within earshot of two control processors 520, the network bridge 120 may select a "best" control processor 520 to join, for example based on network quality. As more network bridges 120 join the control processor 520, the control processor 520 may gradually increase the power of the transmitting messages. According to an embodiment, each network bridge 120 may comprise a unique identification number (UID), which it may report to uniquely identify itself to one or more of the control processors 520.

The control processors 520 provide centralized management for all connected rooms 101. Applications that can run on the control processors 520 can include, for example, software for initiating the centralized wireless network 510 and software for managing the operation of connected rooms 101. Each control processor 520 may comprise an astronomical time clock enabling the control processor 520 to schedule automated timed events. Each control processor 520 may further aggregate information of all "network enabled" rooms and provide real-time status information to users.

As discussed above, the network bridge 120 may interface with the load controller 102 using a bridge interface 319, such as an SPI bus, a USB bus, or the like. The bridge interface 319 is used as a means to transfer data back and forth between the network bridge 120 and load controller 102. According to an embodiment, once connected, the network bridge 120 may act as a master controller for the bridge interface 319 and the load controller may act in a slave mode. However, the load controller 102 may be equipped with a host interrupt line to signal the network bridge 120 of asynchronous communication originated from the load controller 102. Requests or control commands can be initiated from any side (master or slave), however most of the time transactions may be initiated by the master.

Upon connecting to the load controller 102, the network bridge 120 may request the room status report 330, discussed above, including information about all the current in-room devices in room 101 connected to the load controller 102 over the room wireless network 110. The load controller 102 may transmit the room status report 330 as a series of device information frames, one for each reported device. The network bridge 120 may in turn transmit the room status report 330 to the control processor 520 during initiation, periodically, upon a device status change (i.e. room becomes occupied, an error is detected, a battery needs to be replaced, etc.), and/or as requested by the control processor 520. For example, in response to a request from a control processor 520, the network bridge 120 may request the load controller 102 for the last recalled room scene. The last scene may be stored on the load controller 102 in the room status report 330 or can be recalled by the load controller 102 from the lighting control device 103.

According to one embodiment, the various in-room devices and the load controller 102 may be initially installed in the room 101 without the network bridge 120, form the room wireless network 110, and operate as a room based lighting control system 100. Networking the rooms 101 together can be achieved at a later date if the requirements change. The room control system 100 may be connected to the centralized lighting control system 500 via a centralized wireless network 500 at a later time by plugging-in the network bridge 120 to any one of the load controllers 102 in room 101. The network bridge 120 is associated with the room 101 in which it is installed. At that point, the network bridge 120 allows communication between all networked rooms 101 and up to the control processors 520. The network bridge 120 allows the system to grow and be managed centrally.

According to another embodiment, during initial instillation, the load controller 102 may be installed in the room 101 with the network bridge 120 already plugged in. The centralized wireless network 510 and the room wireless network 110 may be commanded to be formed via the control processors 520. The network bridges 120 may receive a form network request from the control processor 520, and command the load controller 102 in the room to form the room wireless network 110.

In operation, the network bridge 120 allows users to monitor the status of devices in individual rooms 101, receive and report error messages, and distribute room based commands sent from a control processor 520. The network bridge 120 amortizes all information in the room 101 and exposes it to the control processor 520 as a summarized, higher level, interface to the room 101. According to an embodiment, interface to each room 101 is simplified and abstracted away from the details of what devices are present in the room. For example, no matter what lighting controls, sensors, or keypads are present in the room 101, the network bridge 120 exposes the same interface to the control processor 520, enabling it to operate at a higher level.

The network bridge 120 may receive various control commands from a control processor 520, for example, to recall a room scene. The room wireless network 110 may also be managed through the control processor 520, for example to remove in-room devices from the room wireless network 110.

According to an embodiment, the modular configuration of the centralized lighting control system 500 also enables fast and efficient firmware updates across a plurality of devices on the network. During firmware updates, the load controller 102 may be configured to act as an over-the-air (OTA) server having the capability to upgrade and downgrade software or firmware of in-room devices connected to the load controller 102 via the in-room wireless network 110. The control processor 520 may send firmware images to the network bridges 120 in the centralized wireless network 510. Each network bridge 120 may store firmware images 332 (FIG. 3) received from the control processor in its memory 327. Effectively, the network bridge 120 acts as a buffer for firmware images 332. The network bridge 120 may then send a firmware image transfer to the load controller 102. According to an embodiment, the network bridge 120 may postpone firmware image transfer until the state of the load controller 102 is idle. If the load controller's 102 state is idle, it will receive the firmware image transfer from the network bridge 120. The network bridge 120 may also indicate to the load controller 102 which in-room target devices should be upgraded. The load controller 102 may then transmit the firmware to the identified in-room target devices.

The control processors 520 may further provide connection between the network bridges 120 and cloud service or server 518 via a corporate network 521 and/or the Internet 517 for central building control and aggregation of building information. Cloud services 518 may aggregate information from a plurality of control processors 520 into a centralized management and control platform for an entire building or campus. For example, the cloud service 518 may display a floorplan with status information of the building, provide historical data, reporting, notifications, or the like.

According to an embodiment, each control processor 520 may provide a web interface allowing users of the system to log into the webpage and be exposed to all the functionally allowed by the control processor 520, for example to configure time clock events, among other functions. FIGS. 6-9 illustrate exemplary schematic diagrams of a web interface to the control processor 520 in the form of a webpage 600. The webpage 600 may comprise four control buttons including a "Setup" button 602, a "Network" button 603, a "Dashboard" button 604, and a "Timeclock" button 605. The webpage 600 may comprise a device setup screen (not shown) accessible through the selection of the "Setup" button 602. The device setup screen may allow the user to perform the following functions: name the control processor, configure cloud service connection, add/delete/modify user accounts, and configure clock settings on the unit. The control processor 520 may have a latitude and longitude entry (or city/state) for the purpose of astronomic timeclock.

The "Timeclock" button 605 may be used to allow the user to schedule time based events using a building scheduling page (not shown). In one embodiment, the control processor 520 may utilize a building automation application disclosed in U.S. patent application Ser. No. 15/200,593, filed Jul. 1, 2016, and titled "Building Automation Scheduling System and Method," the entire contents of which are hereby incorporated by reference.

The webpage 600 may comprise a network setup screen 601 accessible through the selection of the "Network" button 603. The network setup screen 601 may allow the user to configure the IP address of the control processor 520. This screen 601 may also allow for the centralized wireless network 500 to enter into an acquire mode. The network setup screen 601 may comprise a "Found Gateways" list 608 that lists wireless gateway devices 515 automatically discovered by the control processor 520. The network setup screen 601 may comprise a "Rediscover" button 607, which upon selection is configured to command the control processor 520 to discover gateway devices 515 and list them in a "Found Gateways" list 608. The found gateways may be acquired by the control processor 520 using the "Allow Joining" button 610. According to an embodiment, all wireless gateway devices 515 on the control subnet 516 connected to the control processor 520 may be considered a part of the control processor's system. The screen 601 may also list all found network bridges 120 wirelessly acquired by gateway devices 515. The user may associate the found network bridges 120 with a room by pressing the "Add Room to System" button 611. Adding a found network bridge 120 to the system may display a floating popup window (not show) prompting the user to enter a room name. The user may remove network bridges 120 from the centralized control system by pressing the "Remove" button 612.

FIG. 7 illustrates a schematic diagram of a dashboard screen 701 accessible through the selection of the "Dashboard" button 604. The dashboard screen 701 may show the user a hierarchical view of the floor, rooms, and devices controlled by the control processor 520. The dashboard screen 701 may comprise a list of room names 703 controlled by the control processor. The dashboard screen 701 may further comprise a plurality of icons indicating various attributes or states under each room name. For example, a light icon 704 may indicate whether a light is on in the room, a light sensor icon 710 may indicate whether a light sensor 105 is impacting the light level in the room, an occupancy icon 708 indicating whether the room is occupied, a calendar icon 712 indicating whether the room has a timeclock event scheduled for the future, an error icon 706 indicating whether any device within the room has an error associated with it. According to an embodiment, hovering over an icon may display a floating popup window providing additional information regarding the icon. For example, hovering over the error icon 706 may display the most recent error, hovering over the occupancy icon 708 may display the time that the room has been occupied, hovering over the light sensor icon 710 may display the amount of daylight being seen in the room, and hovering over the calendar icon 712 may list the next scheduled timed event and the scheduled action.

Clicking on a room name 703, for example "Room 1", may pull down a room accordion rollout window 801 shown in FIG. 8. The rollout window 801 may list various in-room devices 802 located in that room, including individual device information, such as their model name, serial number, and any relevant errors as indicated by an error icon 806. Status information may also be displayed for each in-room device. For example, the load controller 102 may report its current light dimming level, the occupancy sensor 104 may report its occupancy status, and the light sensor 105 may report its visible daylight level.

Each room may also comprise a gear icon 702 configured for displaying a room control window 901, as shown in FIG. 9, which may give a user options to control and rename the room. Room control window 901 may allow for the user to assign and/or change a room name associated with the network bridge 120 by clicking the edit icon 902. Room control window 901 may further allow listing/editing/deleting timeclock events via a "Recall" button 903. Room control window 901 may allow the user to choose a lighting scene via a "Lighting Scene" pull down menu 904, enable/disable a light sensor via light sensor radio buttons 906, enable/disable an occupancy sensor via occupancy sensor radio buttons 908, or the like. For example, a user may choose a "Room on" scene configured for setting all load controllers 102 associated with the network bridge 120 to go "on" immediately. Such a command may override any room based sensor or keypad messages. For the occupancy sensor 104, room control window 901 may provide a timeout selection fields 910 indicating for how long the occupancy sensor 104 should be disabled. Room control window 901 may also provide a notification field 912 indication as to the current state of the room 101 (e.g., occupied or unoccupied) so that the user does not turn off the lights in an occupied room by accident.

According to another embodiment, there are applications where a separate load controller 102 and a battery powered control device 103 are not desired or impractical. For example, a small bathroom may already comprise a standard switch or gang box directly wired to a lighting load. Referring to FIG. 10, there is shown a lighting control system 1000. Instead of utilizing a separate load controller 102, the lighting control device 1003 may comprise a load controller and be directly wired to the lighting load 1006 via a load line 1013 to control the operation of the lighting load 1006.

According to an embodiment, the lighting control device 1003 may be installed into a standard switch box in a wall. It may comprise similar components to the load controller 102 as shown in FIG. 3. The lighting control device 1003 may include a CPU 301, and a memory 307. The lighting control device 103 may include a user interface 304 in the form of buttons 1007 to control the connected load 1006. The lighting control device 1003 may also include a light indicator. The lighting control device 1003 may comprise a power supply 311 connected to a voltage line to receive an electric AC power signal from an AC mains power source. The lighting control device 1003 may comprise a switch 313 and a dimmer 312 to provide a relay output and a dimmed voltage output signal, respectively, to the lighting load via load line 1013. The lighting control device 1003 may comprise a wireless network interface 302 configured for communicating with other in-room devices, such as the occupancy sensor 1004 and the light sensor 1005, over the wireless network 1010, as discussed above. For example, a dimmable lighting control device 1003 may reduce its output based on the sunlight levels reported by the light sensor 1004. The lighting control device 1003 may act as a router and can take on the role of the network coordinator.

To add the room lighting control system 1000 to the centralized lighting control system 500, a dedicated network bridge power supply 1002 may be utilized. The dedicated power supply 1002 may be used to mechanically secure and power a network bridge 120 in an application where no junction box load controller 102 is used. The mounting enclosure of the dedicated power supply 1002 may be substantially identical to a load controller 102. The dedicated power supply 1002 may be mounted to any existing or installed junction box 1015 in room 1001 via a conduit knockout and may comprise wire leads to connect the dedicated power supply 1001 to an AC power source via a voltage line 1012. The dedicated power supply 1002 may comprise similar components as the load controller 102 shown in FIG. 3, except that the dedicated power supply 1002 may not contain a dimmer 312 or a switch 313 for connection to a lighting load 1006. The dedicated power supply 1002 may comprise a CPU 301, a memory 307, a power supply 311, a user interface 304, a light indicator 309, a wireless network interface 302, and a port 315. The dedicated power supply 1002 is configured to provide power to the network bridge 120 via the port 315.

The wireless network interface 302 is configured to connect the dedicated power supply 1002 to the room wireless network 1010. Additionally, the dedicated power supply 1002 may maintain a room status report 330, as discuss above, in its memory 307 for gathering and retaining information about the in-room devices of the room lighting control system 1000. According to an embodiment, upon installation, the dedicated power supply 1002 may receive the room status report 330 from the lighting control device and load controller 1003. The dedicated power supply 1002 may relate the room status report 330 to the network bridge 120 via the port 315 for centralized control management as discussed above. The network bridge 120 may receive centralized control messages from the centralized wireless network 500 and transmit these messages to the dedicated power supply 1002 via the port 315. The dedicated power supply 1002 may transmit the centralized control messages to the in-room devices, including the lighting control device 1003.

INDUSTRIAL APPLICABILITY

The disclosed embodiments provide a system, software, and a method for a scalable building control system that can be scaled up from a single room control to an entire building control. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:
1. A scalable lighting control system comprising:
an in-room device comprising:
a wireless network interface configured for transmitting room control messages over a room wireless network;
a load controller comprising:
a wireless network interface configured for receiving the room control messages from the in-room devices over the room wireless network;
a bridge interface; and
a power controller configured for electrically connecting to a lighting load; and
a network bridge configured for removably coupling to the load controller, the network bridge comprises:

a wireless network interface configured for receiving centralized control messages over a centralized wireless network; and a load interface configured for connecting to the bridge interface of the load controller and transmitting the centralized control messages to the load controller;

wherein the load controller is configured for controlling the lighting load in response to the room control messages received from the in-room device and the centralized control messages received from the network bridge.

2. The scalable lighting control system of claim 1, wherein the in-room device comprises a lighting control device including a user interface configured for receiving room control messages from a user.

3. The scalable lighting control system of claim 1, wherein the in-room device comprises an occupancy sensor configured for detecting an occupancy status of a room and generating room control messages based on the detected occupancy status.

4. The scalable lighting control system of claim 1, wherein the in-room device comprises a light sensor configured for detecting natural light intensities in a room and generating room control messages based on the detected natural light intensities.

5. The scalable lighting control system of claim 1, wherein the load controller comprises a power supply configured for receiving power from a power source and powering the network bridge via the bridge interface.

6. The scalable lighting control system of claim 1, wherein the power controller of the load controller comprises a switch configured for switching the connected lighting load on and off.

7. The scalable lighting control system of claim 1, wherein the power controller of the load controller comprises a dimmer configured for providing a dimmed voltage output signal to the connected lighting load.

8. The scalable lighting control system of claim 1, wherein the bridge interface of the load controller comprises a port and the load interface of the network bridge comprises a plug.

9. The scalable lighting control system of claim 1, wherein the load interface of the network bridge comprises a port and the bridge interface of the load controller comprises a plug.

10. The scalable lighting control system of claim 1, wherein the room wireless network comprises a peer-to-peer radio frequency mesh wireless network.

11. The scalable lighting control system of claim 1, wherein the centralized wireless network comprises a radio frequency mesh wireless network.

12. The scalable lighting control system of claim 1, wherein the load controller comprises a memory configured for maintaining a room status report comprising information about the lighting load and the in-room device.

13. The scalable lighting control system of claim 12, wherein the load controller transmits the room status report to the network bridge for transmission over the centralized wireless network.

14. The scalable lighting control system of claim 12, wherein the information about the lighting load and the in-room device comprises at least one of a channel of the room wireless network, type of the in-room device, type of available output and input of the in-room device, a number of in-room devices in a room, a number of lighting loads in the room, status of the lighting load, status of the in-room device, and any combinations thereof.

15. The scalable lighting control system of claim 1, wherein the load controller comprises a housing comprising a threaded nipple configured for mounting the load controller to a junction box.

16. The scalable lighting control system of claim 1, wherein the load controller comprises a recess, wherein the network bridge comprises a housing sized and shaped to be recessed within the recess of the load controller.

17. The scalable lighting control system of claim 16, wherein the network bridge is retained within the recess using hooks.

18. The scalable lighting control system of claim 16, wherein the recess comprises a port connected to the bridge interface and configured for receiving a plug connected to the load interface of the network bridge.

19. The scalable lighting control system of claim 1, wherein the network bridge comprises a Bluetooth module configured for communication with a mobile device.

20. The scalable lighting control system of claim 1 further comprising a control processor configured for transmitting centralized control messages to the network bridge over the centralized wireless network.

21. The scalable lighting control system of claim 20, wherein the control processor is configured for connecting to a plurality of network bridges.

22. The scalable lighting control system of claim 20, wherein the control processor is connected to the centralized wireless network via one or more wireless gateways.

23. The scalable lighting control system of claim 20, wherein the load controller comprises a memory configured for maintaining a room status report comprising information about the lighting load and the in-room device, wherein the load controller transmits the room status report to the network bridge for transmission to the control processor over the centralized wireless network.

24. The scalable lighting control system of claim 20, wherein the control processor comprises a user interface configured for receiving centralized control messages from a user.

25. The scalable lighting control system of claim 20, wherein the control processor comprises a network interface configured for receiving centralized control messages from a remote server.

26. The scalable lighting control system of claim 20, wherein the control processor comprises a timeclock and a memory configured for storing a plurality of timed events, wherein the control processor generates centralized control messages for transmission to the network bridge based on the plurality of timed events.

27. The scalable lighting control system of claim 20, wherein the control processor is configured for transmitting a firmware update to the network bridge, wherein the network bridge is configured for receiving the firmware update and storing the firmware update as firmware images on a memory, wherein the network bridge transmits the firmware images to the load controller, wherein the load controller transmits the firmware images to the in-room device.

28. The scalable lighting control system of claim 1, wherein the room wireless network comprises a low latency low bandwidth wireless network configured for substantially real-time communication.

29. The scalable lighting control system of claim 28, wherein the centralized wireless network comprises latency and bandwidth higher than the latency and bandwidth of the room wireless network.

30. The scalable lighting control system of claim 28, wherein the centralized wireless network comprises a high latency high bandwidth wireless network configured for transmitting large amount of data over the centralized wireless network.

31. A method executed by a load controller of a scalable lighting control system, wherein the load controller comprises a wireless network interfaces configured for communicating over a room wireless network, a bridge interface configured for removably coupling to a network bridge, and a power controller configured for electrically connecting to a lighting load, wherein the method comprises the steps of:
receiving room control messages over the room wireless network from one or more in-room devices;
controlling the lighting load in response to the room control messages;
detecting a connection to the network bridge via the bridge interface, wherein the network bridge is configured for receiving centralized control messages from a centralized wireless network;
receiving the centralized control messages from the network bridge; and
controlling the lighting load in response to the centralized control messages.

32. A scalable lighting control system comprising:
a plurality of room lighting control systems each comprising:
one or more in-room devices each configured for transmitting room control messages over a room wireless network; and
a load controller configured for receiving the room control messages from the in-room devices over the room wireless network and controlling an electrically connected lighting load in response to the room control messages;
a plurality of network bridges each configured for removably coupling to at least one load controller of a room lighting control system to connect the room lighting control system as a node of a centralized wireless network, wherein each network bridge is configured for receiving centralized control messages over the centralized wireless network and transmitting the centralized control messages to a connected load controller, wherein the connected load controller is configured for controlling an electrically connected lighting load in response to the centralized control messages.

33. The scalable lighting control system of claim 32, wherein the one or more in-room devices comprise at least one of a lighting control device, an occupancy sensor, a light sensor, and any combinations thereof.

34. The scalable lighting control system of claim 32 further comprising a control processor configured for transmitting centralized control messages to the plurality of network bridges over the centralized wireless network.

35. The scalable lighting control system of claim 34, wherein the control processor is configured for transmitting a firmware update to the plurality of network bridges, wherein each network bridge is configured for receiving the firmware update and storing the firmware update as firmware images on a memory, wherein each network bridge transmits the firmware images to a connected load controller, wherein the connected load controller transmits the firmware images to the in-room device.

36. A scalable lighting control system comprising:
a plurality of room lighting control systems each comprising:
one or more in-room devices each configured for transmitting room control messages over a room wireless network; and
a load controller configured for receiving the room control messages from the in-room devices over the room wireless network and controlling an electrically connected lighting load in response to the room control messages;
a plurality of network bridges each configured for removably coupling to at least one load controller of a room lighting control system to connect the room lighting control system as a node of a centralized wireless network, wherein each network bridge is configured for receiving status information from a connected load controller and transmitting the status information over the centralized wireless network.

37. A scalable lighting control system comprising:
a plurality of room lighting control systems each comprising:
one or more in-room devices each configured for transmitting room control messages over a room wireless network; and
a load controller configured for receiving the room control messages from the in-room devices over the room wireless network and controlling an electrically connected lighting load in response to the room control messages;
a plurality of network bridges each configured for removably coupling to at least one load controller of a room lighting control system to connect the room lighting control system as a node of a centralized wireless network, wherein each network bridge is configured for transmitting messages between the centralized wireless network and a connected load controller.

38. A scalable lighting control system comprising:
a control processor connected via a wireless network interface to a centralized wireless network, wherein the control processor is configured for transmitting centralized control messages;
a plurality of room lighting control systems each comprising:
one or more in-room devices each comprising a wireless network interface configured for transmitting room control messages over a room wireless network;
a load controller comprising:
a wireless network interface configured for receiving the room control messages from the in-room devices over the room wireless network;
a bridge interface; and
a power controller configured for electrically connecting to a lighting load and configured for controlling the lighting load in response to the room control messages received from the in-room devices;
a plurality of network bridges each configured for removably coupling to at least one load controller of a room lighting control system to connect the room lighting control system to the control processor over the centralized wireless network, wherein each network bridge comprises:
a wireless network interface configured for receiving the centralized control messages from the control processor over the centralized wireless network; and a load interface configured for connecting to a bridge interface of a load controller and transmitting the centralized control messages to the connected load controller;

wherein the connected load controller is configured for controlling an electrically connected lighting load in response to the centralized control messages received from the connected network bridge.

39. A scalable lighting control system comprising:
a lighting control device comprising:
  a user interface configured for receiving room control messages from a user;
  a load controller configured for electrically connecting to a lighting load; and
  a wireless network interface configured for communicating over a room wireless network;
a dedicated network bridge power supply comprising:
  a wireless network interface configured for communicating over the room wireless network;
  a power supply; and
  a bridge interface;
a network bridge configured for removably coupling to the dedicated network bridge power supply, the network bridge comprises:
  a wireless network interface configured for receiving centralized control messages over a centralized wireless network; and
  a load interface configured for connecting to the bridge interface for receiving power from the dedicated network bridge power supply and transmitting the centralized control messages to the dedicated network bridge power supply;
wherein the lighting control device is configured for controlling the lighting load in response to the room control messages received from the in-room devices and the centralized control messages received from the dedicated network bridge power supply.

* * * * *